(12) United States Patent
Saitoh et al.

(10) Patent No.: US 12,736,402 B2
(45) Date of Patent: Sep. 15, 2026

(54) SPECTROSCOPIC SYSTEM

(71) Applicant: FUJIFILM Corporation, Tokyo (JP)

(72) Inventors: Yukito Saitoh, Minamiashigara (JP); Yujiro Yanai, Minamiashigara (JP); Kazuya Hisanaga, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 72 days.

(21) Appl. No.: 19/000,213

(22) Filed: Dec. 23, 2024

(65) Prior Publication Data

US 2025/0123145 A1 Apr. 17, 2025

Related U.S. Application Data

(63) Continuation of application No. PCT/JP2023/029591, filed on Aug. 16, 2023.

(30) Foreign Application Priority Data

Aug. 18, 2022 (JP) ................................ 2022-130598
Mar. 6, 2023 (JP) ................................ 2023-033564

(51) Int. Cl.
*G01J 3/18* (2006.01)
*G02F 1/1335* (2006.01)
*G02F 1/1337* (2006.01)

(52) U.S. Cl.
CPC .......... *G01J 3/18* (2013.01); *G02F 1/133543* (2021.01); *G02F 1/133749* (2021.01); *G02F 2201/305* (2013.01)

(58) Field of Classification Search
CPC .... G01J 3/18; G02B 5/00; G02B 5/04; G02B 5/18; G02B 5/30; G02F 1/133543; G02F 1/133749; G02F 2201/305
See application file for complete search history.

(56) References Cited

U.S. PATENT DOCUMENTS 4,691,994 A 9/1987 Afian et al.
5,451,980 A * 9/1995 Simon .................... G02F 1/195 349/1

(Continued)

FOREIGN PATENT DOCUMENTS

JP 11-194295 A 7/1999
JP 2002-90549 A 3/2002

(Continued)

OTHER PUBLICATIONS

International Preliminary Report on Patentability and Written Opinion of the International Searching Authority for International Application No. PCT/JP2023/029591, dated Feb. 27, 2025, with an English translation.

(Continued)

*Primary Examiner* — Hina F Ayub
(74) *Attorney, Agent, or Firm* — Birch, Stewart, Kolasch & Birch, LLP

(57) ABSTRACT

Provided a spectroscopic system where a reduction in size can be achieved. The spectroscopic system includes an optical element, in which the optical element include a prism and a liquid crystal diffraction element disposed on a first surface of the prism directly or with another layer interposed between the prism and the liquid crystal diffraction element, the prism has a second surface tilted with respect to the first surface, a tilt angle of the second surface is 4° or more, the liquid crystal diffraction element includes a cholesteric liquid crystal layer, the cholesteric liquid crystal layer has a liquid crystal alignment pattern in which an orientation of an optical axis derived from a liquid crystal compound changes while continuously rotating in at least one in-plane direction, in a case where a length over which the orientation of the optical axis in the liquid crystal alignment pattern rotates by 180° is set as a single period, a length of the single period is 0.1 to 1.4 μm, and the spectroscopic system allows (Continued)

dispersion target light to be incident into the liquid crystal diffraction element side, reflects the incident light from the liquid crystal diffraction element, totally reflects the reflected light from a surface of the liquid crystal diffraction element opposite to the prism side, allows the totally reflected light to be incident into the prism, and emits the dispersed light from the second surface.

6 Claims, 11 Drawing Sheets

(56) References Cited

U.S. PATENT DOCUMENTS

| | | | |
|---|---|---|---|
| 6,134,051 | A | 10/2000 | Hayakawa et al. |
| 2009/0034077 | A1 | 2/2009 | Kane |
| 2020/0326579 | A1 | 10/2020 | Sato et al. |
| 2022/0333987 | A1 | 10/2022 | Sato et al. |
| 2023/0049424 | A1 | 2/2023 | Mitobe et al. |

FOREIGN PATENT DOCUMENTS

| | | | |
|---|---|---|---|
| WO | WO 2019/131966 | A1 | 7/2019 |
| WO | WO 2021/132630 | A1 | 7/2021 |
| WO | WO 2021/200228 | A1 | 10/2021 |

OTHER PUBLICATIONS

International Search Report for International Application No. PCT/JP2023/029591, dated Oct. 17, 2023, with an English translation.

* cited by examiner 150b
100c
102
102b
$I_{R1}$
$I_{R2}$
$I_{R3}$
$I_{L1}$
$I_{L2}$
$I_{L3}$
112
110
102a
34Rb
34Lb
10c
11
$I_0$

SPECTROSCOPIC SYSTEM

CROSS-REFERENCE TO RELATED APPLICATIONS

This application is a Continuation of PCT International Application No. PCT/JP2023/029591 filed on Aug. 16, 2023, which claims priority under 35 U.S.C. § 119 (a) to Japanese Patent Application No. 2022-130598 filed on Aug. 18, 2022 and Japanese Patent Application No. 2023-033564 filed on Mar. 6, 2023. The above applications are hereby expressly incorporated by reference, in their entirety, into the present application.

BACKGROUND OF THE INVENTION

1. Field of the Invention

The present invention relates to a spectroscopic system.

2. Description of the Related Art

There is disclosed an optical element that includes a cholesteric liquid crystal layer that is obtained by immobilizing a cholesteric liquid crystalline phase and has a helical structure in which a liquid crystal compound is helically turned and laminated, the cholesteric liquid crystal layer having a liquid crystal alignment pattern in which an orientation of an optical axis derived from the liquid crystal compound changes while continuously rotating in at least one in-plane direction. The cholesteric liquid crystal layer having the liquid crystal alignment pattern in the plane reflects incident light in a direction different from specular reflection. Therefore, the use of the cholesteric liquid crystal layer as a diffraction element is disclosed.

WO2019/131966A describes an optical element comprising a plurality of cholesteric liquid crystal layers that are laminated, the cholesteric liquid crystal layers being obtained by immobilizing a cholesteric liquid crystalline phase, in which the plurality of cholesteric liquid crystal layers have different selective reflection center wavelengths, the cholesteric liquid crystal layer has a liquid crystal alignment pattern in which an orientation of an optical axis derived from a liquid crystal compound changes while continuously rotating in at least one in-plane direction, and in a case where, in the liquid crystal alignment pattern of the cholesteric liquid crystal layer, a length over which the direction of the optical axis derived from the liquid crystal compound rotates by 180° in the in-plane direction in which the direction of the optical axis derived from the liquid crystal compound changes while continuously rotating is set as a single period, a permutation of lengths of the selective reflection center wavelengths and a permutation of lengths of the single periods match each other in the plurality of cholesteric liquid crystal layers having different selective reflection center wavelengths.

SUMMARY OF THE INVENTION

As described in WO2019/131966A, the diffraction angle by the cholesteric liquid crystal layer having the liquid crystal alignment pattern depends on the wavelength of incident light. Accordingly, there is a possibility that the cholesteric liquid crystal layer having the liquid crystal alignment pattern can be used as a member that disperses light.

However, since the cholesteric liquid crystal layer reflects light, the light that is incident into and dispersed by the cholesteric liquid crystal layer is emitted to the incidence side. Therefore, in a case where the dispersed light is used, for example, in a case where each of the dispersed light components is detected, a detector for detecting the dispersed light needs to be disposed on the light incidence side of the cholesteric liquid crystal layer. Therefore, a reduction in size as a spectroscopic system is considered to be difficult.

An object of the present invention is to solve the above-described problem of the related art and to provide a spectroscopic system where a reduction in size can be achieved.

In order to achieve the object, the present invention has the following configurations.

[1] A spectroscopic system comprising an optical element, in which the optical element includes a prism and a liquid crystal diffraction element disposed on a first surface of the prism directly or with another layer interposed between the prism and the liquid crystal diffraction element, the prism has a second surface tilted with respect to the first surface, a tilt angle of the second surface with respect to the first surface is 4° or more, the liquid crystal diffraction element includes a cholesteric liquid crystal layer obtained by immobilizing a cholesteric liquid crystalline phase, the cholesteric liquid crystal layer has a liquid crystal alignment pattern in which an orientation of an optical axis derived from a liquid crystal compound changes while continuously rotating in at least one in-plane direction, in a case where a length over which the orientation of the optical axis derived from the liquid crystal compound in the liquid crystal alignment pattern rotates by 180° is set as a single period, a length of the single period is 0.1 to 1.4 μm, and the spectroscopic system allows dispersion target light to be incident into the liquid crystal diffraction element side, reflects the incident light from the liquid crystal diffraction element, totally reflects the reflected light from a surface of the liquid crystal diffraction element opposite to the prism side, allows the totally reflected light to be incident into the prism, and emits the dispersed light from the second surface.

[2] The spectroscopic system according to [1], in which the liquid crystal diffraction element includes the cholesteric liquid crystal layers where twisted directions of helical structures are different from each other.

[3] The spectroscopic system according to [1] or [2], in which the tilt angle of the second surface with respect to the first surface of the prism is 4° to 5°.

[4] The spectroscopic system according to [3], in which in a case where a wavelength of the dispersion target light is represented by λ, the wavelength λ and a single period Λ of the liquid crystal alignment pattern satisfy a relationship of Expression (1), $$0.44 \leq \lambda/\Lambda \leq 1.51. \quad \text{Expression (1)}$$

According to the present invention, it is possible to provide a spectroscopic system where a reduction in size can be achieved.

DESCRIPTION OF THE PREFERRED EMBODIMENTS

Hereinafter, a spectroscopic system according to the present invention will be described in detail based on preferable embodiments shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

[Spectroscopic System]

A spectroscopic system according to the embodiment of the present invention is a spectroscopic system comprising an optical element, in which the optical element includes a prism and a liquid crystal diffraction element disposed on a first surface of the prism directly or with another layer interposed between the prism and the liquid crystal diffraction element, the prism has a second surface tilted with respect to the first surface, a tilt angle of the second surface with respect to the first surface is 4° or more, the liquid crystal diffraction element includes a cholesteric liquid crystal layer obtained by immobilizing a cholesteric liquid crystalline phase, the cholesteric liquid crystal layer has a liquid crystal alignment pattern in which an orientation of an optical axis derived from a liquid crystal compound changes while continuously rotating in at least one in-plane direction, in a case where a length over which the orientation of the optical axis derived from the liquid crystal compound in the liquid crystal alignment pattern rotates by 180° is set as a single period, a length of the single period is 0.1 to 1.4 μm, and the spectroscopic system allows dispersion target light to be incident into the liquid crystal diffraction element side, reflects the incident light from the liquid crystal diffraction element, totally reflects the reflected light from a surface of the liquid crystal diffraction element opposite to the prism side, allows the totally reflected light to be incident into the prism, and emits the dispersed light from the second surface.

Figure 1:
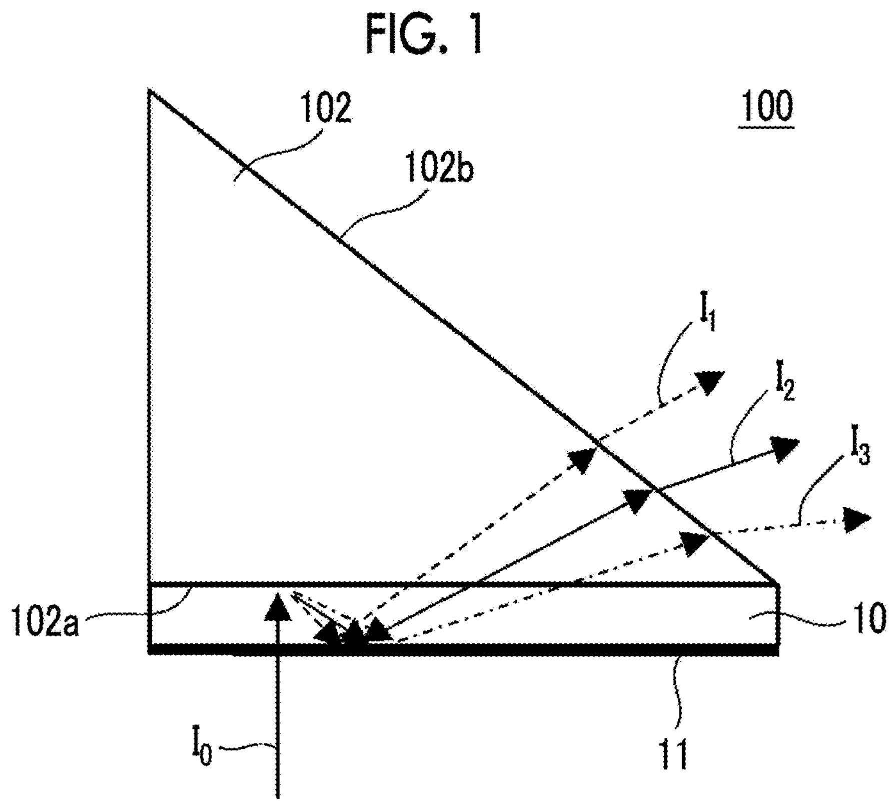
FIG. 1 is a diagram conceptually showing an optical element in a spectroscopic system according to the present invention.

FIG. 1 is a diagram conceptually showing an optical element in the spectroscopic system according to the embodiment of the present invention.

An optical element 100 shown in FIG. 1 includes a prism 102 and a liquid crystal diffraction element 10.

<Prism>

In the example shown in FIG. 1, in the prism 102, a cross section has a triangular prism shape of a right angled triangle, and the liquid crystal diffraction element 10 is disposed on a first surface 102*a* that is one surface among side surfaces. In addition, in the prism 102, a second surface 102*b* that is another surface among the side surfaces is tilted with respect to the first surface 102*a*, and a tilt angle with respect to the first surface 102*a* is 4° or more. In addition, the remaining side surface (third surface) of the prism 102 is perpendicular to the first surface 102*a*.

The prism 102 emits, from the second surface 102*b*, light incident from the first surface 102*a* on which the liquid crystal diffraction element 10 is disposed. Accordingly, the prism 102 is formed of a material through which dispersed light transmits. A transmittance of the prism 102 with respect to the dispersed light is preferably 50% or more, more preferably 70% or more, and still more preferably 85% or more.

The size of the prism 102 is not limited and may be appropriately set depending on the material for forming the prism 102, the use of the optical element 100 (spectroscopic system), required spectral performance, the spot diameter of the dispersion target light, and the like.

As the material of the prism 102, for example, glass or a synthetic resin such as a thermoplastic resin or a thermosetting resin can be used.

<Liquid Crystal Diffraction Element>

The liquid crystal diffraction element 10 is disposed on the first surface 102*a* of the prism 102 directly or with another layer interposed therebetween.

Figure 2:
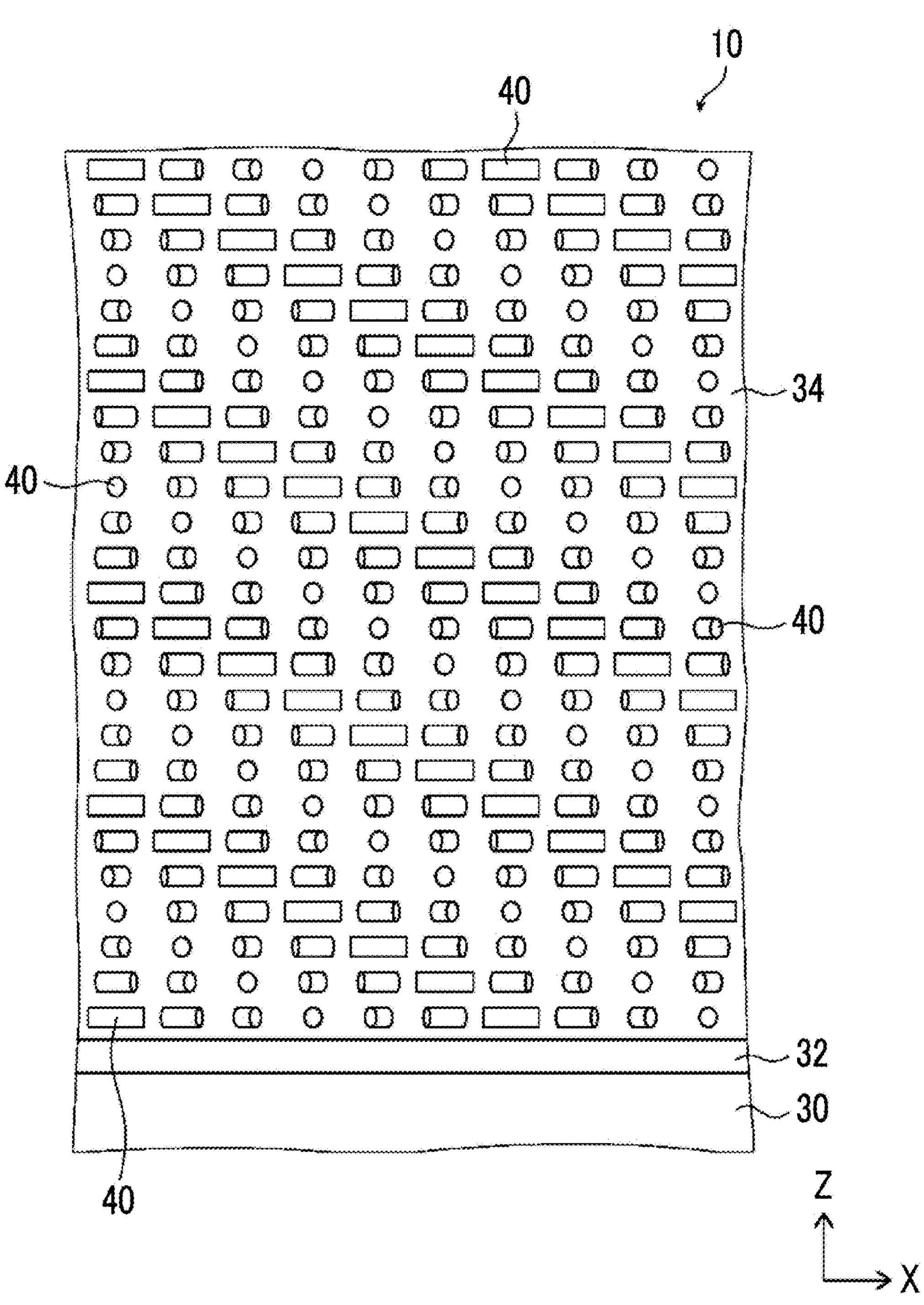
FIG. 2 is a diagram conceptually showing a liquid crystal diffraction element in the optical element according to the present invention.
Figure 3:
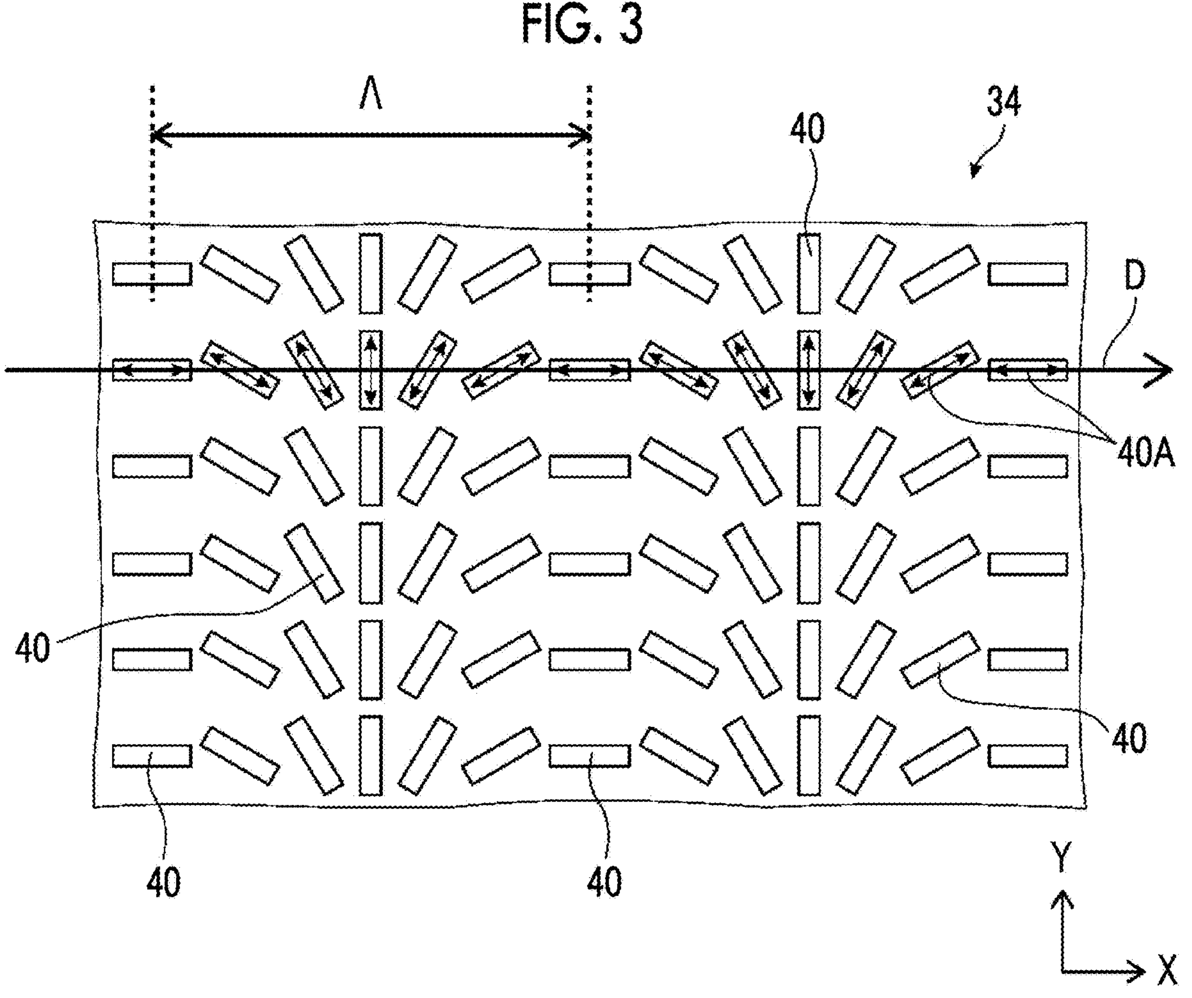
FIG. 3 is an enlarged plan view conceptually showing a part of the cholesteric liquid crystal layer of the liquid crystal diffraction element shown in FIG. 2.

FIG. 2 is a diagram conceptually showing an example of the liquid crystal diffraction element 10. FIG. 3 is a plan view showing a cholesteric liquid crystal layer in the liquid crystal diffraction element 10. The plan view is a view in a case where the cholesteric liquid crystal layer is seen from the top in FIG. 2, that is, a view in a case where the cholesteric liquid crystal layer is seen from a thickness direction (lamination direction of the respective layers (films)). In addition, in FIG. 3, in order to clarify the configuration of the cholesteric liquid crystal layer, only a liquid crystal compound 40 on the surface is shown.

The liquid crystal diffraction element 10 shown in FIG. 2 includes a cholesteric liquid crystal layer 34, an alignment film 32, and a support 30. As the liquid crystal diffraction element 10 provided on the first surface 102*a* of the prism 102 in the optical element 100, the cholesteric liquid crystal layer 34 may be laminated on the support 30 and the alignment film 32. Alternatively, the liquid crystal diffraction element 10 may be in a state where, for example, only the alignment film 32 and the cholesteric liquid crystal layer 34 are laminated after peeling off the support 30. In addition, the liquid crystal diffraction element 10 may be in a state where only the cholesteric liquid crystal layer 34 is present after peeling off the support 30 and the alignment film 32. In addition, for example, in a configuration where the liquid crystal diffraction element 10 includes the support 30, the alignment film 32, and the cholesteric liquid crystal layer 34, the liquid crystal diffraction element 10 may be disposed such that the support 30 side faces the prism 102, or may be disposed such that the cholesteric liquid crystal layer 34 side faces the prism 102.

[Cholesteric Liquid Crystal Layer]

The cholesteric liquid crystal layer 34 is a liquid crystal phase obtained by immobilizing a cholesterically aligned liquid crystal phase (cholesteric liquid crystalline phase). As is well known, the cholesteric liquid crystal layer has a helical structure in which the liquid crystal compound is helically turned and laminated in the thickness direction. In the helical structure, a configuration in which the liquid crystal compound is helically rotated once (rotated by) 360° and laminated is set as one helical pitch (helical pitch), and plural pitches of the helically turned liquid crystal compounds are laminated.

The cholesteric liquid crystal layer reflects left circularly polarized light or right circularly polarized light in a specific wavelength range and allows transmission of the other light depending on the length of the helical pitch and the helical turning direction (sense) of the liquid crystal compound.

Here, in the present invention, the cholesteric liquid crystal layer 34 has a liquid crystal alignment pattern in which an orientation of an optical axis derived from a liquid crystal compound changes while continuously rotating in at least one in-plane direction.

The optical axis 40A derived from the liquid crystal compound 40 is an axis having the highest refractive index in the liquid crystal compound 40, that is, a so-called slow axis. For example, in a case where the liquid crystal compound 40 is a rod-like liquid crystal compound, the optical axis 40A is parallel to a rod-like major axis direction. On the other hand, in a case where the liquid crystal compound 40 is a disk-like liquid crystal compound, the optical axis 40A of the liquid crystal compound 40 refers to an axis parallel to the normal direction with respect to a disc plane of the disk-like liquid crystal compound. In the following description, the optical axis 40A derived from the liquid crystal compound 40 will also be referred to as "the optical axis 40A of the liquid crystal compound 40" or "the optical axis 40A".

As shown in FIG. 3, in the plan view (X-Y plane) of the cholesteric liquid crystal layer 34, the liquid crystal compounds 40 are arranged along a plurality of arrangement axes D in the X-Y plane. On each of the arrangement axes D, the orientation of the optical axis 40A of the liquid crystal compound 40 changes while continuously rotating in the one in-plane direction along the arrangement axis D. In the region shown in FIG. 3, for the convenience of description, it is assumed that the arrangement axis D is directed to the X direction. In addition, in the Y direction, the liquid crystal compounds 40 in which the orientations of the optical axes 40A are the same are aligned at regular intervals.

"The orientation of the optical axis 40A of the liquid crystal compound 40 changes while continuously rotating in the one in-plane direction along the arrangement axis D" represents that angles between the optical axes 40A of the liquid crystal compounds 40 and the arrangement axes D vary depending on positions in the arrangement axis D direction and gradually change from θ to θ+180° or θ−180° along the arrangement axis D. That is, in each of the plurality of liquid crystal compounds 40 arranged along the arrangement axis D, as shown in FIG. 3, the optical axis 40A changes along the arrangement axis D while rotating on a given angle basis.

A difference between the angles of the optical axes 40A of the liquid crystal compounds 40 adjacent to each other in the arrangement axis D direction is preferably 45° or less, more preferably 15° or less, and still more preferably less than 15°.

In addition, in the present invention, regarding a rotation direction of the optical axis 40A of the liquid crystal compound in the arrangement axis D direction, the liquid crystal compounds 40 (the optical axes 40A) rotate in an orientation in which the angle between the optical axes 40A of the liquid crystal compounds 40 adjacent to each other in the arrangement axis D direction decreases. Accordingly, in the optically-anisotropic layer shown in FIGS. 2 and 3, the optical axis 40A of the liquid crystal compound 40 rotates to the right (clockwise) in the direction indicated by the arrow of the arrangement axis D.

In the cholesteric liquid crystal layer 34, in the liquid crystal alignment pattern of the liquid crystal compound 40, the length (distance) over which the optical axis 40A of the liquid crystal compound 40 rotates by 180° in the arrangement axis D direction in which the optical axis 40A changes while continuously rotating in a plane is the length Λ of the single period in the liquid crystal alignment pattern.

That is, a distance between centers of two liquid crystal compounds 40 in the arrangement axis D direction is the length Λ of the single period, the two liquid crystal compounds 40 having the same angle in the arrangement axis D direction. Specifically, as shown in FIG. 3, a distance between centers in the arrangement axis D direction of two liquid crystal compounds 40 in which the arrangement axis D direction and the direction of the optical axis 40A match with each other is the length Λ of the single period. In the following description, the length Λ of the single period will also be referred to as "single period Λ".

In the liquid crystal alignment pattern of the cholesteric liquid crystal layer 34, the single period Λ is repeated in the arrangement axis D direction, that is, in the one in-plane direction in which the orientation of the optical axis 40A changes while continuously rotating.

Hereinafter, an action of diffraction of the cholesteric liquid crystal layer will be described.

In a cholesteric liquid crystal layer of the related art, a helical axis derived from a cholesteric liquid crystalline phase is perpendicular to the main surface (X-Y plane), and a reflecting surface thereof is parallel to the main surface (X-Y plane). The cholesteric liquid crystalline phase has specular reflectivity. Therefore, for example, in a case where light is incident from the normal direction into the cholesteric liquid crystal layer in the related art, the light is reflected in the normal direction.

On the other hand, the cholesteric liquid crystal layer 34 having the liquid crystal alignment pattern reflects incident light in a state where it is tilted in the arrangement axis D direction.

For example, assuming that the cholesteric liquid crystal layer 34 selectively reflects right circularly polarized light of red light, in a case where light is incident into the cholesteric liquid crystal layer 34, the cholesteric liquid crystal layer 34 reflects only right circularly polarized light of red light and allows transmission of the other light.

Figure 4:
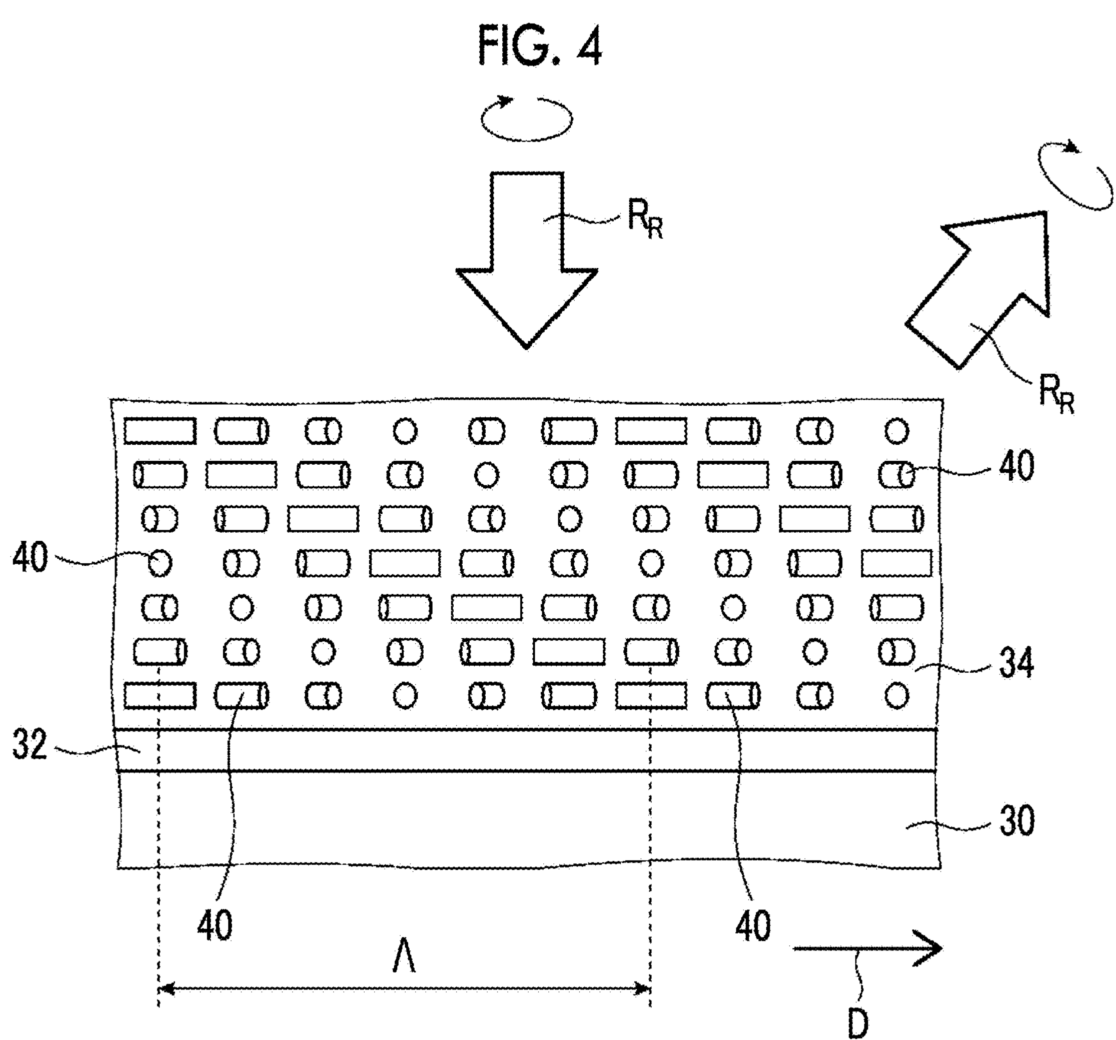
FIG. 4 is a conceptual diagram showing an action of the cholesteric liquid crystal layer.

Here, in the cholesteric liquid crystal layer 34, the optical axis 40A of the liquid crystal compound 40 changes while rotating in the arrangement axis D direction (the one in-plane direction). In addition, the liquid crystal alignment pattern formed in the cholesteric liquid crystal layer 34 is a pattern that is periodic in the arrangement axis D direction. Therefore, as shown in FIG. 4, right circularly polarized light RR of red light vertically incident into the cholesteric liquid crystal layer 34 is reflected (diffracted) in a direction (orientation) corresponding to the period of the liquid crystal alignment pattern, and the reflected right circularly polarized light RR of red light is reflected (diffracted) in a direction tilted with respect to the X-Y plane (the main surface of the cholesteric liquid crystal layer) in the arrangement axis D direction (orientation).

Accordingly, in the cholesteric liquid crystal layer 34, by appropriately setting the arrangement axis D as the one direction in which the optical axis 40A rotates, the reflection direction (reflection orientation) of light can be adjusted.

In addition, in a case where circularly polarized light having the same wavelength and the same turning direction is reflected, by reversing the rotation direction of the optical axis 40A of the liquid crystal compound 40 toward the arrangement axis D direction, a reflection direction of the circularly polarized light can be reversed.

That is, in FIGS. 2 and 3, the rotation direction of the optical axis 40A toward the arrangement axis D direction is clockwise, and one circularly polarized light is reflected in a state where it is tilted in the arrangement axis D direction. By setting the rotation direction of the optical axis 40A to be counterclockwise, the circularly polarized light is reflected in a state where it is tilted in a direction opposite to the arrangement axis D direction.

Further, in the cholesteric liquid crystal layer having the same liquid crystal alignment pattern, the reflection direction is reversed by adjusting the helical turning direction of the liquid crystal compound 40, that is, the turning direction of circularly polarized light to be reflected.

For example, in a case where the helical turning direction is right-twisted, the liquid crystal layer selectively reflects right circularly polarized light, and has the liquid crystal alignment pattern in which the optical axis 40A rotates clockwise in the arrangement axis D direction. As a result, the right circularly polarized light is reflected in a state where it is tilted in the arrangement axis D direction.

In addition, for example, in a case where the helical turning direction is left-twisted, the liquid crystal layer selectively reflects left circularly polarized light, and has the liquid crystal alignment pattern in which the optical axis 40A rotates clockwise in the arrangement axis D direction. As a result, the left circularly polarized light is reflected in a state where it is tilted in a direction opposite to the arrangement axis D direction.

In the cholesteric liquid crystal layer 34 having the liquid crystal alignment pattern, as the single period Λ decreases, the angle of reflected light with respect to the incidence light increases. That is, as the single period Λ decreases, reflected light is reflected to be largely tilted with respect to incidence light.

The diffraction angle by the cholesteric liquid crystal layer 34 having the liquid crystal alignment pattern varies depending on the wavelength of light. Specifically, as the wavelength of light increases, the angle of reflected light with respect to incidence light increases. Accordingly, the cholesteric liquid crystal layer 34 can disperse incident light by diffracting (reflecting) the light at an angle that varies depending on the wavelength.

Here, in the present invention, a surface of the liquid crystal diffraction element 10 opposite to the prism 102 is a total reflection surface 11, and light reflected and diffracted from the liquid crystal diffraction element 10 (cholesteric liquid crystal layer 34) is totally reflected from the total reflection surface 11. In other words, the liquid crystal diffraction element 10 (cholesteric liquid crystal layer 34) reflects and diffracts incident light at an angle at which total reflection occurs on the surface of the liquid crystal diffraction element 10 opposite to the prism 102. That is, the liquid crystal diffraction element 10 (the cholesteric liquid crystal layer 34) reflects incident light at a large diffraction angle to cause total reflection to occur.

The angle (critical angle) is determined depending on refractive indices of media between which the total reflection surface 11 of the liquid crystal diffraction element 10 is interposed. That is, in a case where the total reflection surface 11 side of the liquid crystal diffraction element 10 is the cholesteric liquid crystal layer 34 and the liquid crystal diffraction element 10 is in contact with air, the angle at which total reflection occurs is determined depending on the refractive index of the cholesteric liquid crystal layer 34 and the refractive index of air. In addition, in a case where the total reflection surface 11 side of the liquid crystal diffraction element 10 is the support 30, the angle at which total reflection occurs is determined depending on the refractive index of the support 30 and the refractive index of air.

Accordingly, regarding the diffraction angle of light by the liquid crystal diffraction element 10 (cholesteric liquid crystal layer 34), the angle at which total reflection occurs may be appropriately set the refractive index of the layer on the total reflection surface 11 side of the liquid crystal diffraction element 10 and the like.

A refractive index n of a cholesteric liquid crystal layer that is formed using a general liquid crystal material and a support is about 1.45 to 1.8. Therefore, an angle (critical angle φ) at which total reflection occurs on the total reflection surface 11 at an air interface is about 34° to 44° from $\sin \varphi = 1/n$.

As described above, the diffraction angle by the cholesteric liquid crystal layer 34 is determined basically depending on the length of the single period Λ of the liquid crystal alignment pattern. From the viewpoint that the cholesteric liquid crystal layer 34 reflects light vertically incident into the cholesteric liquid crystal layer 34 at the angle at which total reflection occurs on the total reflection surface 11, the length of the single period Λ is 0.1 to 1.4 μm. The length of the single period Λ is preferably 0.2 to 1.2 μm and more preferably 0.3 to 1 μm.

In addition, as described above, the cholesteric liquid crystal layer according to the embodiment of the present invention reflects and diffracts incident dispersion target light to disperse the light. That is, the cholesteric liquid crystal layer needs to reflect dispersion target light having a broad bandwidth. On the other hand, a general cholesteric liquid crystal layer has wavelength selective reflectivity, and reflects light in a narrow band.

Accordingly, in order to widen the reflection wavelength range, it is preferable that the cholesteric liquid crystal layer according to the embodiment of the present invention has a structure in which the helical pitch changes in the thickness direction. Since the cholesteric liquid crystal layer has the structure in which the helical pitch changes in the thickness direction, the reflection wavelength range of the cholesteric liquid crystal layer can be widened. In addition, in order to widen the reflection wavelength range, it is also preferable to increase a birefringence index (Δn) of liquid crystal.

In the cholesteric liquid crystal layer where the helical pitch changes in the thickness direction, in a stripe pattern of bright portions and dark portions in a cross section observed with a scanning electron microscope (SEM), intervals of the bright portions and the dark portions vary in the thickness direction.

Alternatively, the liquid crystal diffraction element according to the embodiment of the present invention may be configured to include a plurality of cholesteric liquid crystal layers having different helical pitches. In this case, each of the plurality of cholesteric liquid crystal layers has the liquid crystal alignment pattern, and reflects and diffracts light having a selective reflection wavelength in the incident dispersion target light at the angle at which total reflection can occur on the total reflection surface. In addition, by making the diffraction angles by the cholesteric liquid crystal layers different from each other, the cholesteric liquid crystal layers reflect light at different angles (directions) such that the dispersion target light can be dispersed.

<<Method of Forming Cholesteric Liquid Crystal Layer>>

The cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound 40 in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the cholesteric liquid crystal layer may further include a surfactant and a chiral agent.

——Polymerizable Liquid Crystal Compound——

The polymerizable liquid crystal compound may be a rod-like liquid crystal compound or a disk-like liquid crystal compound.

Examples of the rod-like polymerizable liquid crystal compound for forming the cholesteric liquid crystalline phase include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase disclosed in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer disclosed in JP1997-133810A (JP-H9-133810A), and a liquid crystal polymer disclosed in JP1999-293252A (JP-H11-293252A) can be used.

——Disk-Like Liquid Crystal Compound——

As the disk-like liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

——Surfactant——

The liquid crystal composition used for forming the cholesteric liquid crystal layer may include a surfactant.

It is preferable that the surfactant is a compound that can function as an alignment control agent contributing to the stable or rapid alignment of a cholesteric liquid crystalline phase. Examples of the surfactant include a silicone-based surfactant and a fluorine-based surfactant. Among these, a fluorine-based surfactant is preferable.

Specific examples of the surfactant include compounds described in paragraphs “0082” to “0090” of JP2014-119605A, compounds described in paragraphs “0031” to “0034” of JP2012-203237A, exemplary compounds described in paragraphs “0092” and “0093” of JP2005-099248A, exemplary compounds described in paragraphs “0076” to “0078” and “0082” to “0085” of JP2002-129162A, and fluorine (meth)acrylate polymers described in paragraphs “0018” to “0043” of JP2007-272185A.

The surfactants may be used alone or in combination of two or more kinds.

As the fluorine-based surfactant, a compound described in paragraphs “0082” to “0090” of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

Examples of the surfactant include the following compounds, but the present invention is not limited thereto.

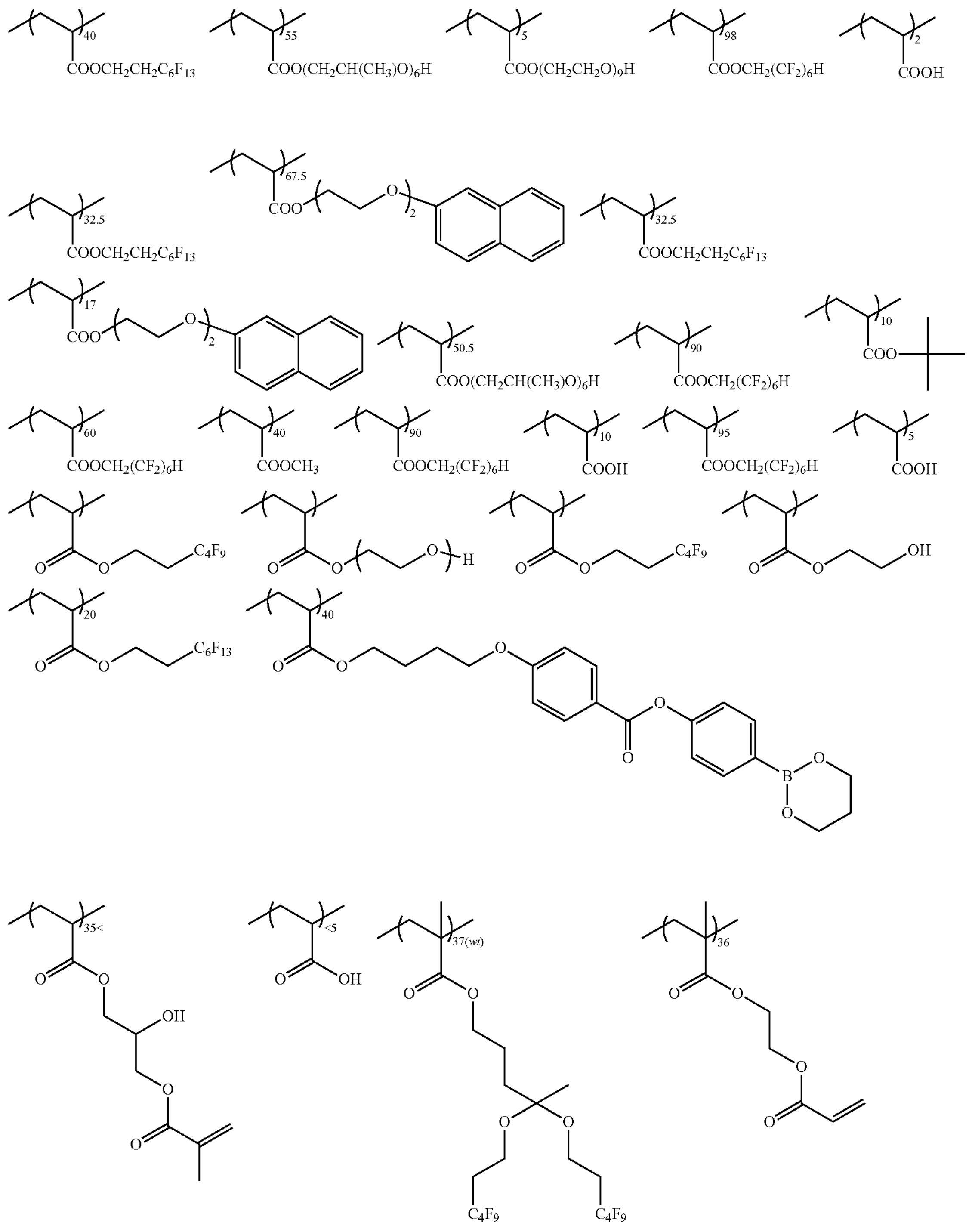

-continued
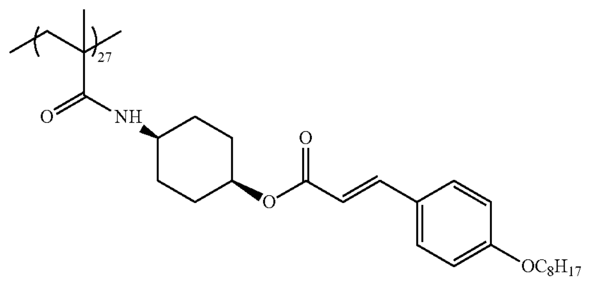
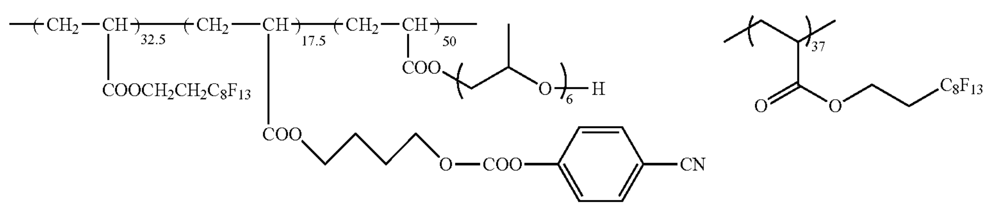
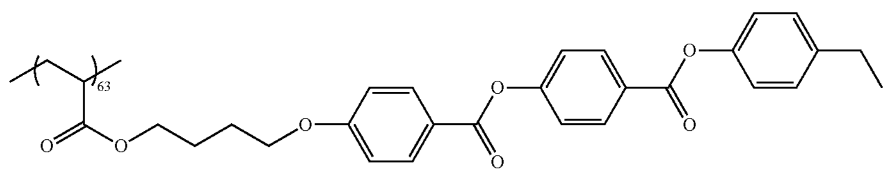
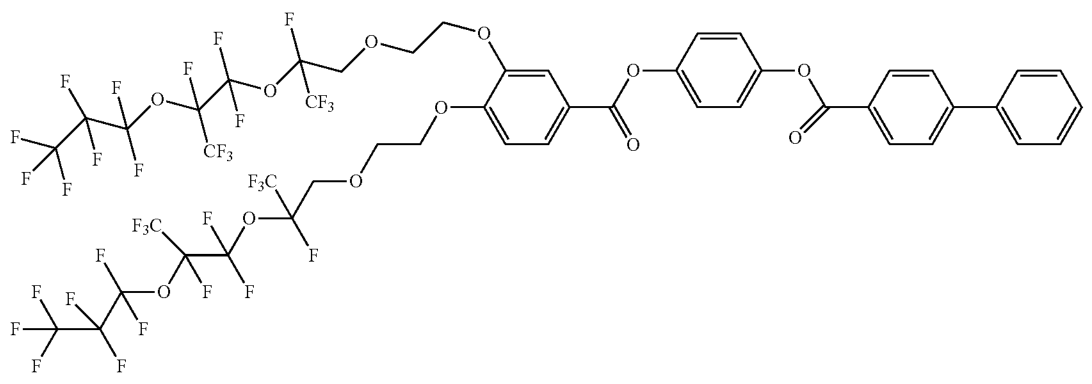
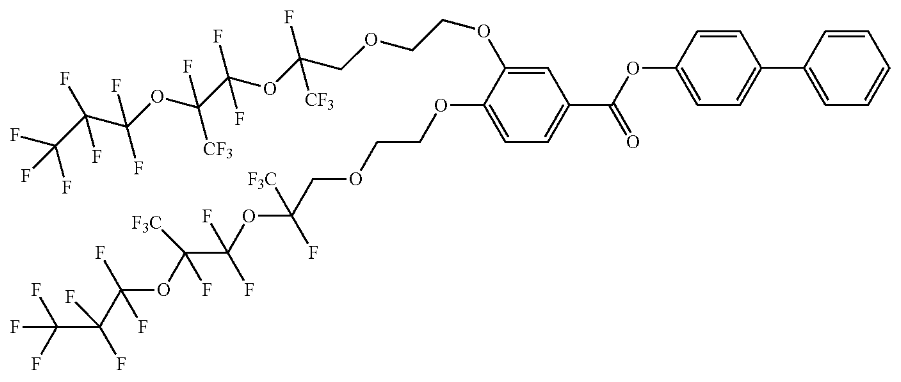

-continued
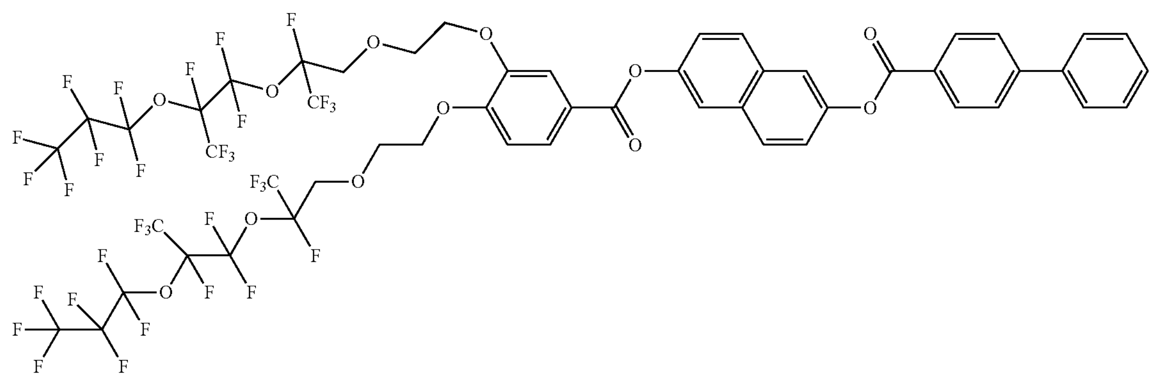
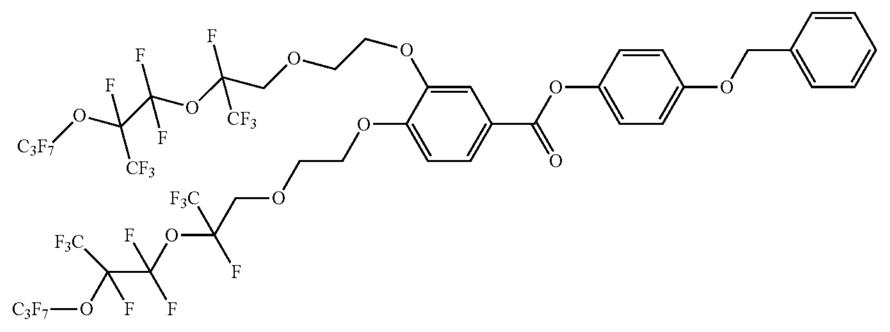
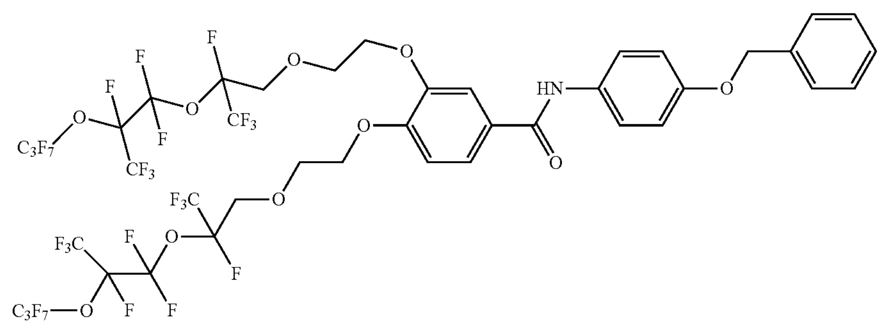
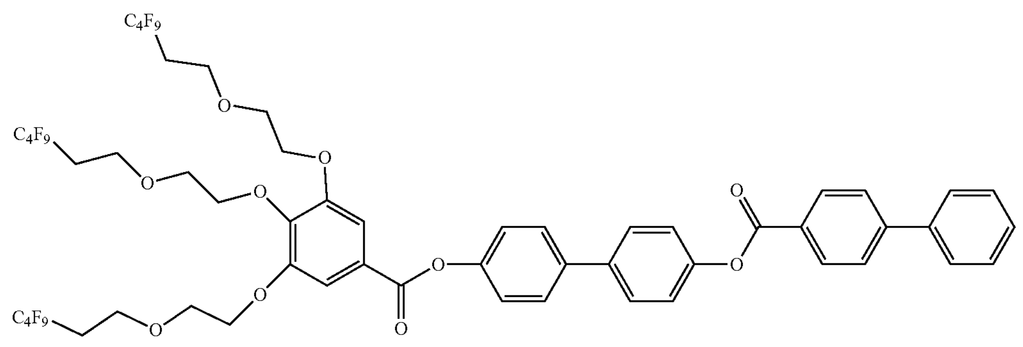

-continued

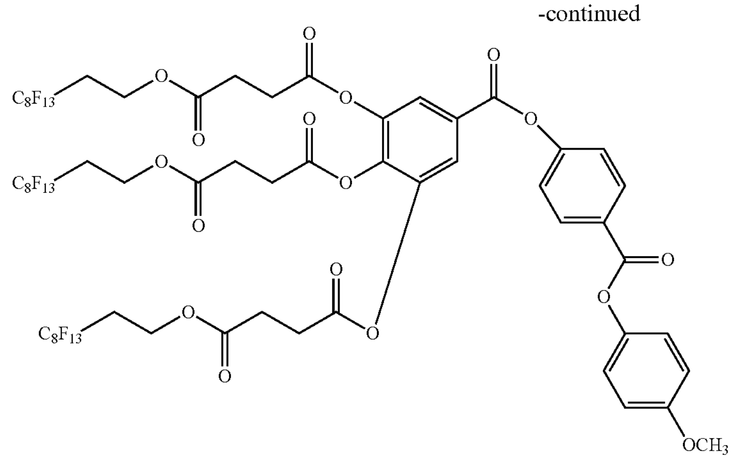

——Chiral Agent (Optically Active Compound)——

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes a chiral carbon atom. However, an axially chiral compound or a planar chiral compound not having a chiral carbon atom can also be used as the chiral agent. Examples of the axially chiral compound or the planar chiral compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photo mask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

——Polymerization Initiator——

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator to be used is a photopolymerization initiator which initiates a polymerization reaction with ultraviolet irradiation.

Examples of the photopolymerization initiator include an a-carbonyl compound (described in U.S. Pat. Nos. 2,367,661A and 2,367,670A), an acyloin ether (described in U.S. Pat. No. 2,448,828A), an a-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound. ——Crosslinking Agent——

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth) acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. The crosslinking agents may be used alone or in combination of two or more kinds.

The content of the crosslinking agent is preferably 3 to 20 mass % and more preferably 5 to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

——Other Additives——

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the cholesteric liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. The organic solvents may be used alone or in combination of two or more kinds. Among these, a ketone is preferable in consideration of an environmental burden.

In a case where the cholesteric liquid crystal layer is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

That is, in a case where the cholesteric liquid crystal layer is formed on the alignment film 32 described below, it is preferable that the cholesteric liquid crystal layer obtained by immobilizing a cholesteric liquid crystalline phase is formed by applying the liquid crystal composition to the alignment film 32, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the cholesteric liquid crystal layer. In the drying and/or heating step, the liquid crystal compound in the liquid crystal composition may be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

In addition, as a method of forming the cholesteric liquid crystal layer, a method of forming a tilted liquid crystal layer that is formed of a composition including a disk-like liquid crystal compound and in which a molecular axis of the disk-like liquid crystal compound is tilted with respect to the surface and forming a cholesteric liquid crystal layer on the tilted liquid crystal layer using a composition including a liquid crystal compound is suitably used.

The method of forming the cholesteric liquid crystal layer using the tilted liquid crystal layer is described in paragraphs “0049” to “0194” of WO2019/181247A.

The thickness of the cholesteric liquid crystal layer is not particularly limited, and may be appropriately set depending on the use of the liquid crystal diffraction element, the light reflectivity required for the cholesteric liquid crystal layer, the material for forming the cholesteric liquid crystal layer, and the like.

In addition, in the above-described cholesteric liquid crystal layer where the helical pitch changes in the thickness direction, the chiral agent in which back isomerization, dimerization, isomerization, dimerization or the like occurs during light irradiation such that the helical twisting power (HTP) changes is used. By irradiating the liquid crystal composition with light having a wavelength at the HTP of the chiral agent changes before or during the curing of the liquid crystal composition for forming the cholesteric liquid crystal layer, the cholesteric liquid crystal layer having the PG structure can be formed.

For example, by using a chiral agent in which the HTP decreases during light irradiation, the HTP of the chiral agent decreases during light irradiation. Here, the irradiated light is absorbed by a material for forming the cholesteric liquid crystal layer. Accordingly, for example, in a case where the light is irradiated from the upper side, the irradiation dose of the light gradually decreases from the upper side to the lower side. That is, the amount of decrease in the HTP of the chiral agent gradually decreases from above to below. Therefore, on the upper side where the decrease in HTP is large, the induction of helix is small, and thus the helical pitch is long. On the lower side where the decrease in HTP is small, helix is induced by the original HTP of the chiral agent, and thus the helical pitch decreases. As a result, the cholesteric liquid crystal layer where the helical pitch changes in the thickness direction can be formed.

The light irradiation may be performed before or during the exposure for curing the cholesteric liquid crystal layer. In addition, the wavelength of light for changing the HTP of the chiral agent and the wavelength of light for curing the cholesteric liquid crystal layer may be the same as or different from each other.

[Support]

The support 30 supports the alignment film 32 and the cholesteric liquid crystal layer 34.

As the support 30, various sheet-shaped materials (films or plate-shaped materials) can be used as long as they can support the alignment film 32 and the cholesteric liquid crystal layer 34.

A transmittance of the support 30 with respect to dispersed light is preferably 50% or more, more preferably 70% or more, and still more preferably 85% or more.

The thickness of the support 30 is not particularly limited and may be appropriately set depending on the use of the optical element 100, a material for forming the support 30, and the like in a range where the alignment film 32 and the cholesteric liquid crystal layer 34 can be supported.

The thickness of the support 30 is preferably 1 to 1000 μm, more preferably 3 to 250 μm, and still more preferably 5 to 150 μm.

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

[Alignment Film]

The alignment film 32 is formed on the surface of the support 30.

The alignment film 32 is an alignment film for aligning the liquid crystal compound 40 to a predetermined liquid crystal alignment pattern during the formation of the cholesteric liquid crystal layer 34.

As described above, in the present invention, the cholesteric liquid crystal layer 34 has the liquid crystal alignment pattern in which the orientation of the optical axis 40A derived from the liquid crystal compound 40 changes while continuously rotating in one in-plane direction (refer to FIG. 3). Accordingly, the alignment film 32 is formed such that the cholesteric liquid crystal layer 34 can form the liquid crystal alignment pattern.

In the following description, "the orientation of the optical axis 40A rotates" will also be simply referred to as "the optical axis 40A rotates".

As the alignment film 32, various well-known photo-alignment films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as @-tricosanoic acid, dioctadecylmethylammonium chloride, or methyl stearate.

The alignment film 32 formed by a rubbing treatment can be formed by rubbing a surface of a polymer layer with paper or fabric in a given direction multiple times.

As the material used for the alignment film 32, a material for forming the alignment film 32 or the like, for example, polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the liquid crystal diffraction element, the alignment film 32 can be suitably used as a so-called photo-alignment film obtained by irradiating a photo-alignment material with polarized light or non-polarized light. That is, in the liquid crystal diffraction element, a photo-alignment film that is formed by applying a photo-alignment material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitably used.

The thickness of the alignment film 32 is not particularly limited. The thickness with which a required alignment function can be obtained may be appropriately set depending on the material for forming the alignment film 32.

The thickness of the alignment film 32 is preferably 0.01 to 5 μm and more preferably 0.05 to 2 μm.

A method of forming the alignment film 32 is not limited. Any one of various well-known methods corresponding to a material for forming the alignment film 32 can be used. For example, a method including: applying the alignment film 32 to a surface of the support 30; drying the applied alignment film 32; and exposing the alignment film 32 to laser light to form an alignment pattern can be used.

Figure 5:
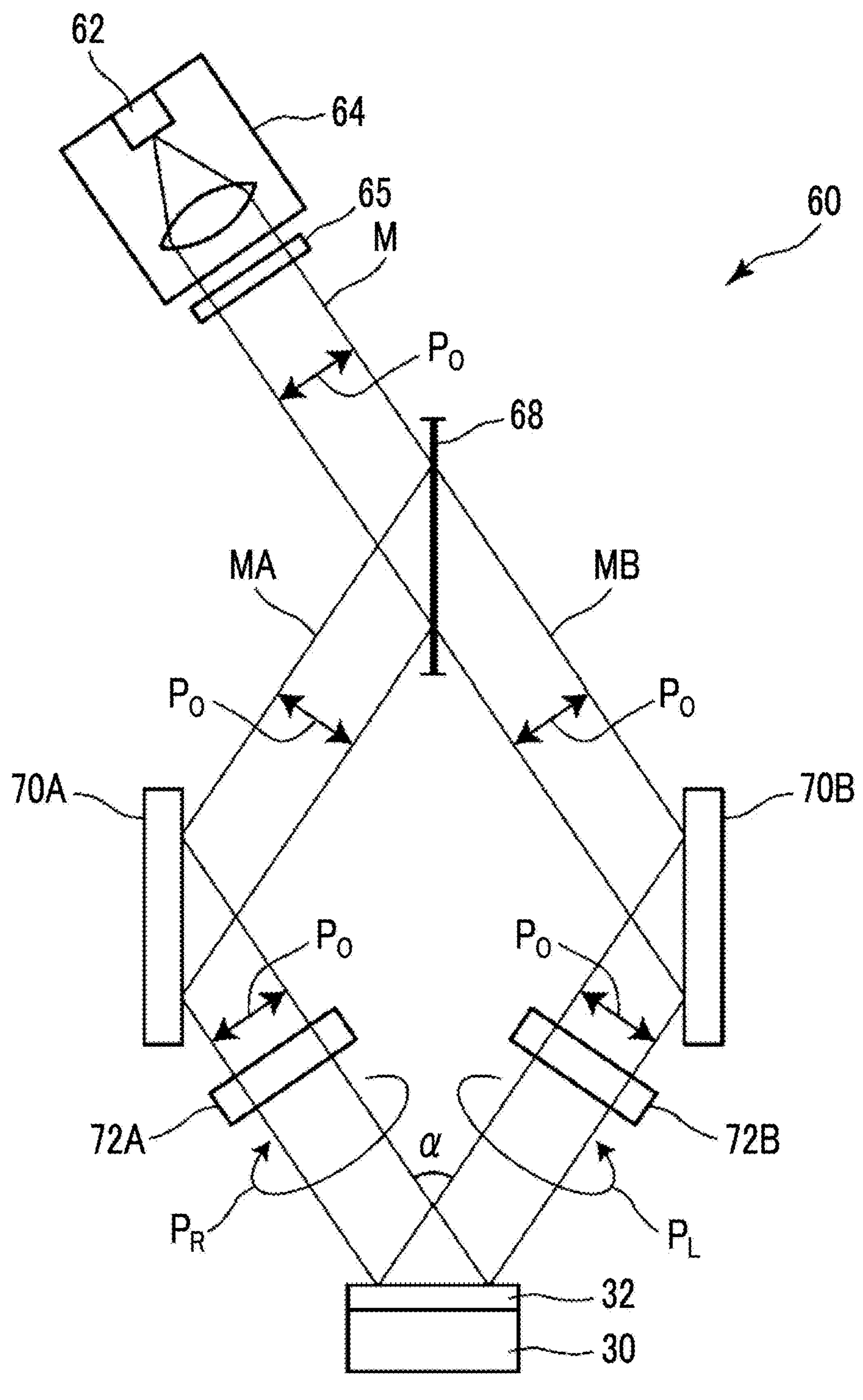
FIG. 5 is a conceptual diagram showing an example of an exposure device that exposes an alignment film for forming the cholesteric liquid crystal layer.

FIG. 5 conceptually shows an example of an exposure device that exposes the alignment film to form an alignment pattern.

An exposure device 60 shown in FIG. 5 includes: a light source 64 including a laser 62; an λ/2 plate 65 that changes a polarization direction of laser light M emitted from the laser 62; a beam splitter 68 that splits the laser light M emitted from the laser 62 into two beams MA and MB; mirrors 70A and 70B that are disposed on optical paths of the split two beams MA and MB; and λ/4 plates 72A and 72B.

The light source 64 emits linearly polarized light $P_O$. The 24 plate 72A converts the linearly polarized light $P_O$ (beam MA) into right circularly polarized light $P_R$, and the λ/4 plate 72B converts the linearly polarized light $P_O$ (beam MB) into left circularly polarized light PL.

The support 30 including the alignment film 32 on which the alignment pattern is not yet formed is disposed at an exposed portion, the two beams MA and MB intersect and interfere with each other on the alignment film 32, and the alignment film 32 is irradiated with and exposed to the interference light.

Due to the interference in this case, the polarization state of light with which the alignment film 32 is irradiated periodically changes according to interference fringes. As a result, an alignment film (hereinafter, also referred to as "patterned alignment film") having an alignment pattern in which the alignment state changes periodically is obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one direction in which the optical axis 40A rotates can be adjusted.

By forming the cholesteric liquid crystal layer on the alignment film 32 having the alignment pattern in which the alignment state periodically changes, the cholesteric liquid crystal layer having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has the alignment pattern for aligning the liquid crystal compound to have the liquid crystal alignment pattern in which the orientation of the optical axis of the liquid crystal compound in the cholesteric liquid crystal layer formed on the patterned alignment film changes while continuously rotating in at least one in-plane direction. In a case where an axis in the orientation in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that an orientation in which the light amount is the maximum or the minimum gradually changes in the one in-plane direction.

In the present invention, the alignment film is provided as a preferable aspect and is not a configuration requirement.

For example, the following configuration can also be adopted, in which, by forming the alignment pattern on the support using a method of rubbing the support, a method of processing the support with laser light or the like, or the like, the cholesteric liquid crystal layer or the like has the liquid crystal alignment pattern in which the orientation of the optical axis 40A derived from the liquid crystal compound 40 changes while continuously rotating in at least one in-plane direction. That is, in the present invention, the support may be made to act as the alignment film.

<Action of Spectroscopic System>

An action of the spectroscopic system including the above-described optical element 100 will be described.

As shown in FIG. 1, the spectroscopic system allows dispersion target light $I_0$ to be incident from the liquid crystal diffraction element 10 side into the optical element 100. In the example shown in the drawing, the light $I_0$ is incident into the liquid crystal diffraction element 10 from a direction substantially perpendicular to the main surface (total reflection surface 11) of the liquid crystal diffraction element 10. The incident light $I_0$ is reflected and diffracted in the cholesteric liquid crystal layer 34 of the liquid crystal diffraction element 10. In addition, in this case, since the diffraction angle varies depending on the wavelength, the light is dispersed. In the example shown in the drawing, to simplify the description, it is assumed that three light components $I_1$, $I_2$, and $I_3$ indicated by arrows are dispersed. In addition, in the example shown in the drawing, the light $I_0$ is diffracted in the orientation direction on the second surface 102*b* side.

The dispersed light components $I_1$, $I_2$, and $I_3$ are reflected toward the surface (that is, the total reflection surface 11) of the liquid crystal diffraction element 10 on the side where the light $I_0$ is incident. At this time, the light components $I_1$, $I_2$, and $I_3$ are reflected at a large diffraction angle by the liquid crystal diffraction element 10 (cholesteric liquid crystal layer 34). Therefore, the light components $I_1$, $I_2$, and $I_3$ are incident into the total reflection surface 11 at the angle at which total reflection occurs, and are totally reflected. The totally reflected light components $I_1$, $I_2$, and $I_3$ travel toward the surface of the liquid crystal diffraction element 10 on the prism 102 side. The totally reflected light components $I_1$, $I_2$, and $I_3$ are incident into the prism 102 side of the liquid crystal diffraction element 10 at a large incidence angle, but a difference in refractive index between the liquid crystal diffraction element 10 and the prism 102 is small. Therefore, the light components $I_1$, $I_2$, and $I_3$ are incident into the prism 102 without being totally reflected from an interface between the liquid crystal diffraction element 10 and the prism 102.

The light components $I_1$, $I_2$, and $I_3$ incident into the prism 102 travel in the prism 102 and are incident into the second surface 102*b*. Here, the second surface 102*b* is tilted at 4° or more with respect to the first surface 102*a*. Therefore, the incidence angle of the light components $I_1$, $I_2$, and $I_3$ with respect to the second surface 102*b* is less than the angle (critical angle) at which total reflection occurs. Accordingly, the light components $I_1$, $I_2$, and $I_3$ are emitted from the second surface 102*b*. That is, in the optical element 100, the dispersed light components $I_1$, $I_2$, and $I_3$ can be emitted from the surface opposite to the surface (total reflection surface 11) where the dispersion target light $I_0$ is incident.

Figure 12:
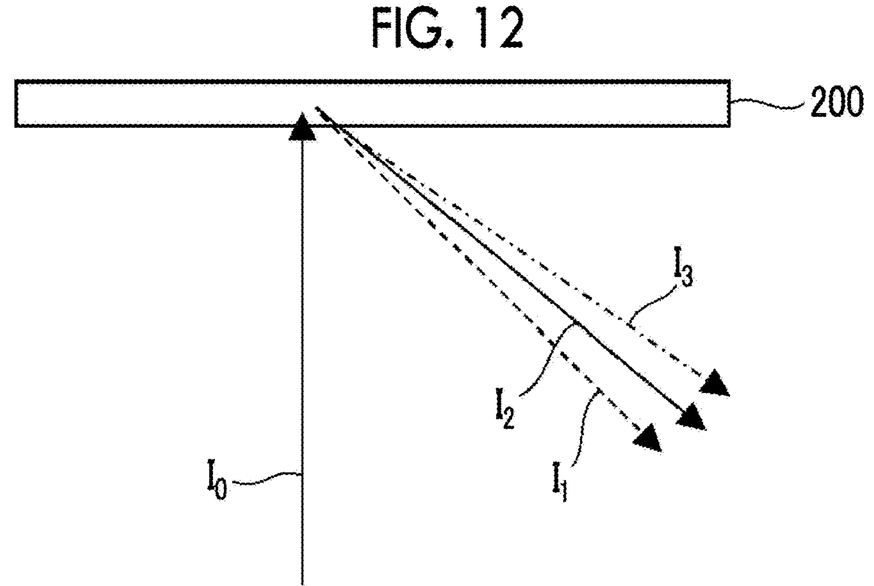
FIG. 12 is a diagram showing dispersion by a cholesteric liquid crystal layer in the related art.

As described above, in a case where the cholesteric liquid crystal layer having the liquid crystal alignment pattern is used as a member that disperses light, as shown in FIG. 12, the light components $I_1$, $I_2$, and $I_3$ that are incident into the cholesteric liquid crystal layer and dispersed are emitted to the incidence side. Therefore, a detector or the like for detecting the dispersed light needs to be disposed on the light incidence side of the cholesteric liquid crystal layer. In this case, there is a restriction in that, for example, the detector needs to be disposed not to interrupt an optical path of incident light. Therefore, a reduction in size as a spectroscopic system is considered to be difficult.

On the other hand, the spectroscopic system according to the embodiment of the present invention includes, as an optical element that disperses light, the optical element including: the prism; and the liquid crystal diffraction element that includes the cholesteric liquid crystal layer having the liquid crystal alignment pattern, the tilt angle of the second surface with respect to the first surface where the liquid crystal diffraction element is disposed is 4° or more, and the length of the single period in the liquid crystal alignment pattern of the cholesteric liquid crystal layer is 0.1 to 1.4 μm. As a result, the spectroscopic system according to the embodiment of the present invention can allow dispersion target light to be incident into the liquid crystal diffraction element side, can reflect the incident light from the liquid crystal diffraction element, can totally reflect the reflected light from the total reflection surface of the liquid crystal diffraction element opposite to the prism side, can allow the totally reflected light to be incident into the prism, and can emit the dispersed light from the second surface. That is, the spectroscopic system can emit the dispersed light from the surface side opposite to the surface where the dispersion target light is incident into the optical element. Accordingly, for example, in a case where the dispersed light is detected, the detector for detecting the dispersed light can be disposed on the surface side opposite to the incidence side. Therefore, the restriction in the disposition of the detector is small, and the size of the spectroscopic system can be reduced.

Here, in a case where the cholesteric liquid crystal layer (liquid crystal diffraction element) having the liquid crystal alignment pattern where the length of the single period is 0.1 to 1.4 μm is not in contact with the prism, that is, in a case where the cholesteric liquid crystal layer (liquid crystal diffraction element) that can reflect and diffract incident light from one surface of the liquid crystal diffraction element at the angle at which total reflection occurs is not in contact with the prism, the light that is totally reflected from the one main surface of the liquid crystal diffraction element reaches the other main surface of the liquid crystal diffraction element. In this case, since total reflection occurs on the other main surface, the total reflection is repeated on both of the main surfaces of the liquid crystal diffraction element, and the light dispersed from the liquid crystal diffraction element cannot be emitted from the main surface. Accordingly, the cholesteric liquid crystal layer alone cannot be used as a member that disperses light.

On the other hand, in the present invention, with the configuration in which the cholesteric liquid crystal layer (liquid crystal diffraction element) that has the liquid crystal alignment pattern where the length of the single period is 0.1 to 1.4 μm and can reflect and diffract incident light from the total reflection surface of the liquid crystal diffraction element at the angle at which total reflection occurs is disposed on the first surface of the prism directly or with another layer interposed therebetween, the light that is dispersed by the cholesteric liquid crystal layer and is totally reflected from the total reflection surface can be extracted, and the optical member can be used as a member that disperses light.

Here, from the viewpoint of emitting the light that is dispersed by the cholesteric liquid crystal layer (liquid crystal diffraction element) and is totally reflected from the second surface of the prism to the outside, the tilt angle of the second surface with respect to the first surface of the prism is preferably 4° to 75°, more preferably 10° to 70°, and still more preferably 20° to 60°.

In addition, from the viewpoint of reflecting and diffracting incident light from the total reflection surface of the liquid crystal diffraction element at the angle at which total reflection occurs, the length of the single period of the liquid crystal alignment pattern of the cholesteric liquid crystal layer is preferably 0.2 to 1.2 μm, more preferably 0.3 to 1 μm, and still more preferably 0.4 to 1 μm.

In addition, it is preferable that in a case where the wavelength of the dispersion target light is represented by λ, the wavelength λ and the single period Λ of the liquid crystal alignment pattern satisfy a relationship of Expression (1).

$$0.44 \leq \lambda/\Lambda \leq 1.51 \quad \text{Expression (1)}$$

Here, the wavelength λ of the dispersion target light is the center wavelength in the bandwidth of the dispersion target light.

In a case where the wavelength λ of the dispersion target light and the single period Λ of the liquid crystal alignment pattern satisfy the relationship of Expression (1), the condition where the incidence light is totally reflected from the total reflection surface 11 (even in a case where the diffracted light returns to the total reflection surface 11, the diffracted light is not emitted from the total reflection surface 11) and the condition where the light is not totally reflected from the second surface of the prism can be obtained.

In addition, in the example shown in FIG. 1, the spectroscopic system is configured to allow the dispersion target light to be incident into the optical element 100 in a direction substantially perpendicular to the main surface (total reflection surface 11) of the liquid crystal diffraction element 10, but the present invention is not limited thereto. The spectroscopic system may be configured to allow the dispersion target light to be incident into the optical element 100 from a direction tilted with respect to the perpendicular line of the main surface of the liquid crystal diffraction element 10.

By increasing an angle (hereinafter, also referred to as the incidence angle") with respect to the perpendicular line of the main surface of the liquid crystal diffraction element in a case where the dispersion target light is incident into the optical element, the angle can be adjusted to an angle at which the light that is reflected, diffracted, and dispersed from the cholesteric liquid crystal layer is totally reflected from the total reflection surface.

The incidence angle of the dispersion target light is preferably −45° to 45°, more preferably −40° to 40°, and still more preferably −30° to 30°.

In addition, in the example shown in FIG. 1, the prism 102 has a triangular prism shape of a right angled triangle in cross section, but the present invention is not limited thereto. The shape of the prism 102 may be configured to include the first surface where the liquid crystal diffraction element is disposed and the second surface that is tilted at 4° or more with respect to the first surface. For example, the cross sectional shape of the prism 102 may be a polygonal shape such as a quadrangular shape or a pentagonal shape. In addition, the prism 102 may have a curved portion.

Here, in the example shown in FIG. 2, the liquid crystal diffraction element 10 is configured to include one cholesteric liquid crystal layer 34, but the present invention is not limited thereto. The liquid crystal diffraction element may include two or more cholesteric liquid crystal layers having the liquid crystal alignment pattern. In addition, the liquid crystal diffraction element may be configured to include cholesteric liquid crystal layers where the twisted directions of the helical structures are different from each other.

In addition, the liquid crystal diffraction element may be provided in direct contact with the prism by forming an alignment film and an optically-anisotropic layer on one surface of the prism. In addition, the liquid crystal diffraction element may be provided in direct contact with one surface of the prism using a method such as an alignment treatment, liquid crystal application, or polymerization.

Alternatively, the liquid crystal diffraction element may be bonded to one surface of the prism using a bonding agent such as an optical clear adhesive (OCA), an optically transparent double-sided tape, or an ultraviolet curable resin. In addition, the liquid crystal diffraction element may be directly bonded to one surface of the prism using an adhesion force strengthening surface treatment such as a plasma treatment. Optionally, an antireflection film or the like may be provided between the prism and the liquid crystal diffraction element.

Figure 6:
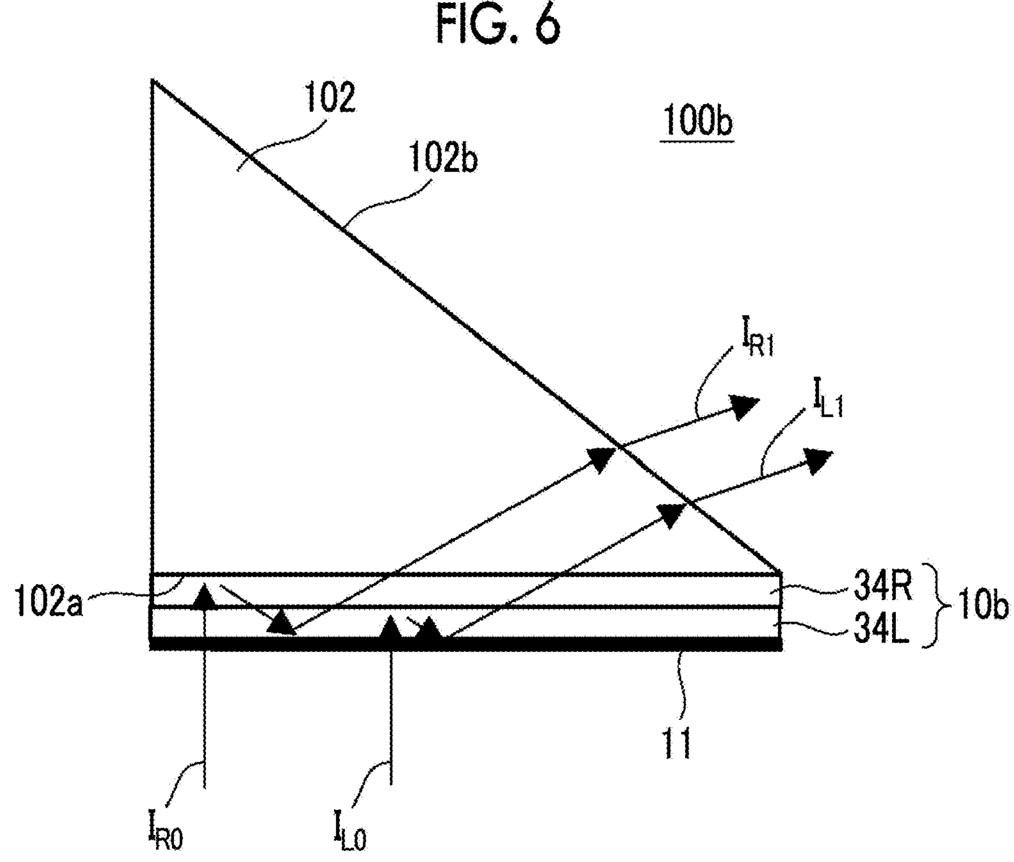
FIG. 6 is a diagram conceptually showing another example of the optical element in the spectroscopic system according to the present invention.

FIG. 6 is a diagram conceptually showing another example of the optical element in the spectroscopic system according to the embodiment of the present invention.

An optical element 100*b* shown in FIG. 6 includes the prism 102 and a liquid crystal diffraction element 10*b*. The prism 102 has the same configuration as the prism 102 of the optical element shown in FIG. 1, and thus the description thereof will not be repeated.

The liquid crystal diffraction element 10*b* includes a cholesteric liquid crystal layer 34R and a cholesteric liquid crystal layer 34L. Although not shown in the drawing, the liquid crystal diffraction element 10*b* may include a support and/or an alignment film.

In this case, the cholesteric liquid crystal layer has circularly polarized light selective reflectivity of reflecting only right circularly polarized light or left circularly polarized light depending on the helical turning direction (sense) of the liquid crystal compound. The cholesteric liquid crystal layer 34R including the liquid crystal diffraction element 10*b* is a cholesteric liquid crystal layer that reflects right circularly polarized light, and the cholesteric liquid crystal layer 34L is a cholesteric liquid crystal layer that reflects left circularly polarized light.

In addition, a selective reflection wavelength of the cholesteric liquid crystal layer 34R and a selective reflection wavelength of the cholesteric liquid crystal layer 34L overlap each other and preferably match with each other.

As in the cholesteric liquid crystal layer 34 shown in FIGS. 2 and 3, both of the cholesteric liquid crystal layer 34R and the cholesteric liquid crystal layer 34L have the liquid crystal alignment pattern in which the orientation of the optical axis derived from the liquid crystal compound changes while continuously rotating in at least one in-plane direction.

A rotation direction of the optical axis of the liquid crystal compound in the liquid crystal alignment pattern of the cholesteric liquid crystal layer 34R (hereinafter, referred to as the rotation direction of the liquid crystal alignment pattern) is opposite to a rotation direction of the optical axis of the liquid crystal compound in the liquid crystal alignment pattern of the cholesteric liquid crystal layer 34L are opposite to each other. As described above, in a case where the rotation direction of the liquid crystal alignment pattern in the cholesteric liquid crystal layer that selectively reflects right circularly polarized light and the rotation direction of the liquid crystal alignment pattern in the cholesteric liquid crystal layer that selectively reflects left circularly polarized light are the same as each other, the two cholesteric liquid crystal layers reflect and diffract light components in directions opposite to each other (opposite orientation directions) along the arrangement axis D. Accordingly, by setting the rotation direction of the liquid crystal alignment pattern in the cholesteric liquid crystal layer 34R that selectively reflects right circularly polarized light and the rotation direction of the liquid crystal alignment pattern in the cholesteric liquid crystal layer 34L that selectively reflects left circularly polarized light are the same as each other to be opposite to each other, the two cholesteric liquid crystal layers reflect and diffract light components in the same direction (orientation direction) along the arrangement axis D.

In addition, the length of the single period in the liquid crystal alignment pattern of the cholesteric liquid crystal layer 34R is the same as the length of the single period in the liquid crystal alignment pattern of the cholesteric liquid crystal layer 34L. As described above, the diffraction angle of light by the cholesteric liquid crystal layer having the liquid crystal alignment pattern varies depending on the length of the single period of the liquid crystal alignment pattern. Therefore, by setting the length of the single period in the liquid crystal alignment pattern of the cholesteric liquid crystal layer 34R to be the same as the length of the single period in the liquid crystal alignment pattern of the cholesteric liquid crystal layer 34L, the diffraction angle of light by the cholesteric liquid crystal layer 34R and the diffraction angle of light by the cholesteric liquid crystal layer 34L can be made to be the same.

An action of the spectroscopic system that includes the optical element 100*b* including the liquid crystal diffraction element 10*b* will be described using FIGS. 6 and 7. For convenience of description, FIG. 6 shows only an arrow representing light having one wavelength among light components that are reflected, diffracted, and dispersed by each of the cholesteric liquid crystal layer 34R and the cholesteric liquid crystal layer 34L. In addition, for convenience of description, FIG. 7 shows no arrow regarding the reflection, the dispersion, and the total reflection on the total reflection surface in the cholesteric liquid crystal layer.

As shown in FIG. 6, the spectroscopic system allows dispersion target light ($I_{R0}$ and $I_{L0}$) to be incident from the liquid crystal diffraction element 10*b* side into the optical element 100*b*. Among the dispersion target light components, the right circularly polarized light component $I_{R0}$ transmits through the cholesteric liquid crystal layer 34L and is reflected and dispersed by the cholesteric liquid crystal layer 34R. The reflected light $I_{R1}$ is totally reflected from the surface (total reflection surface 11) of the liquid crystal diffraction element 10*b* opposite to the prism 102, travels toward the prism 102, is incident into the prism 102, and is emitted from the second surface 102*b* of the prism 102. In addition, among the dispersion target light components, the left circularly polarized light component $I_{L0}$ is reflected and dispersed by the cholesteric liquid crystal layer 34L. The reflected light $I_{L1}$ is totally reflected from the surface (total reflection surface 11) of the liquid crystal diffraction element 10*b* opposite to the prism 102, travels toward the prism 102, transmits through the cholesteric liquid crystal layer 34R, is incident into the prism 102, and is emitted from the second surface 102*b* of the prism 102.

The length of the single period in the liquid crystal alignment pattern of the cholesteric liquid crystal layer 34R is the same as the length of the single period in the liquid crystal alignment pattern of the cholesteric liquid crystal layer 34L. Therefore, a traveling direction of the light $I_{R1}$ having one wavelength that is dispersed by the cholesteric liquid crystal layer 34R is substantially parallel to a traveling direction of the light $I_{L1}$ having the same wavelength that is dispersed by the cholesteric liquid crystal layer 34L. Accordingly, the light $I_{R1}$ and the light $I_{L1}$ emitted from the second surface 102*b* of the prism 102 are substantially parallel to each other at each of the wavelengths.

Figure 7:
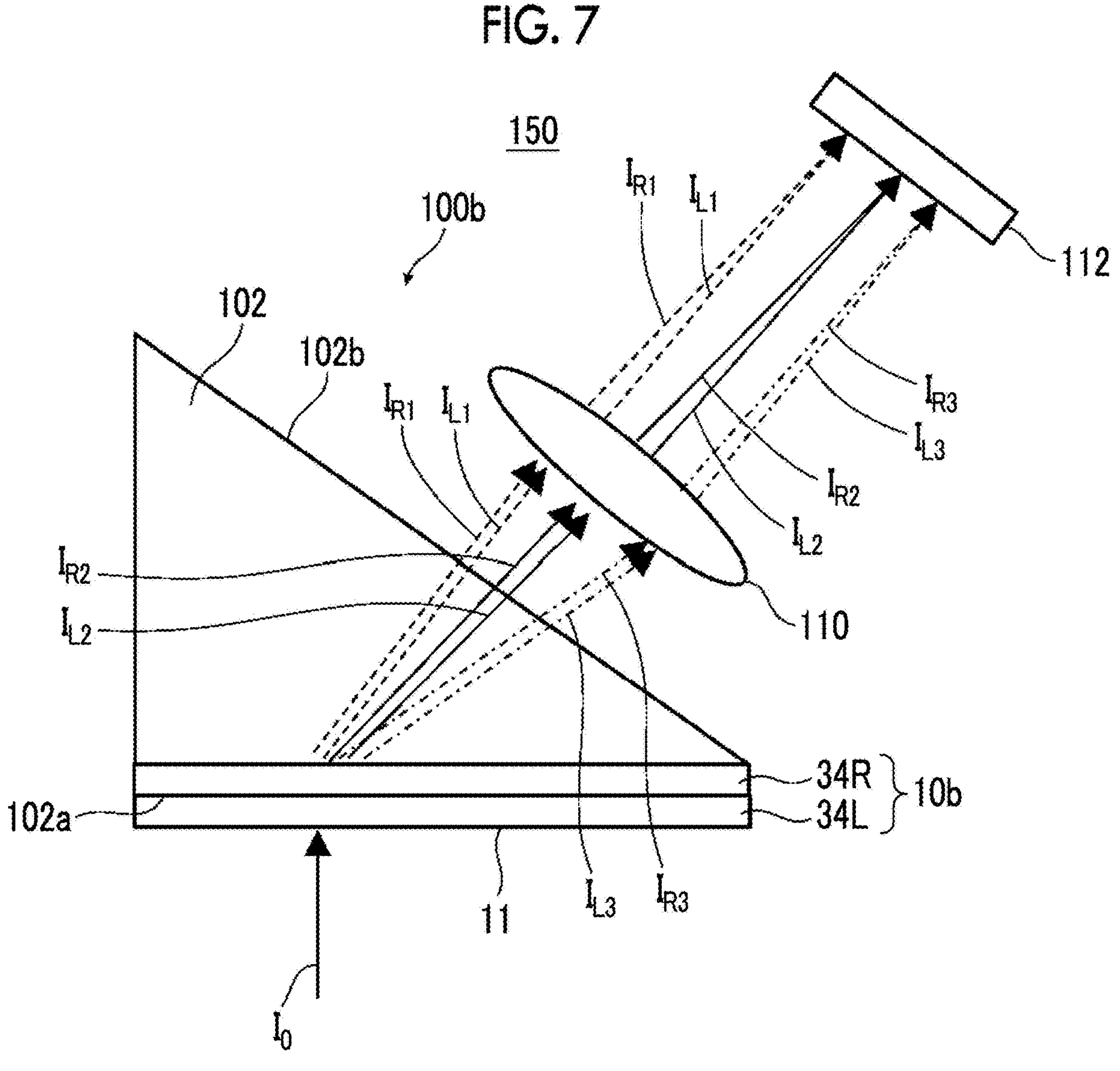
FIG. 7 is a diagram conceptually showing another example of the spectroscopic system including the optical element shown in FIG. 6.

FIG. 7 shows an example of the spectroscopic system including the optical element that emits the dispersion target light components substantially parallel to each other at each of the wavelengths as described above.

A spectroscopic system 150 shown in FIG. 7 includes the above-described optical element 100*b*, a condenser lens 110 that is disposed to be spaced on the second surface side of the optical element 100*b*, and a sensor 112 that is disposed opposite to the optical element 100*b* side of the condenser lens 110.

As described above, the optical element 100*b* disperses each of the right circularly polarized light component and the left circularly polarized light component of the incident dispersion target unpolarized light $I_0$, and emits the dispersed light from the second surface 102*b* of the prism 102. In this case, as shown in FIG. 7, the right circularly polarized light $I_{R1}$ and the left circularly polarized light $I_{L1}$ having the same wavelength are emitted parallel to each other, right circularly polarized light $I_{R2}$ and left circularly polarized light $I_{L2}$ that have a wavelength different from that of the right circularly polarized light $I_{R1}$ and the left circularly polarized light $I_{L1}$ are emitted parallel to each other at an angle different from that of the right circularly polarized light $I_{R1}$ and the left circularly polarized light $I_{L1}$, and right circularly polarized light $I_{R3}$ and left circularly polarized light $I_{L3}$ that are different from the above light components are emitted parallel to each other at an angle different from that of the right circularly polarized light $I_{R1}$ and the left circularly polarized light $I_{L1}$ and that of the right circularly polarized light $I_{R2}$ and the left circularly polarized light $I_{L2}$.

The light emitted from the second surface 102*b* of the prism 102 is incident into the condenser lens 110.

The condenser lens 110 converges the right circularly polarized light $I_{R1}$ and the left circularly polarized light $I_{L1}$ incident parallel to each other, the right circularly polarized light $I_{R2}$ and the left circularly polarized light $I_{L2}$ incident parallel to each other, and the right circularly polarized light $I_{R3}$ and the left circularly polarized light $I_{L3}$ incident parallel to each other to form focal points on the detection surface of the sensor 112, respectively.

The condenser lens 110 is not particularly limited, and well-known convex lenses or the like can be used.

The sensor 112 is a detector for detecting light by photoelectric conversion and may be a two-dimensional sensor where a plurality of pixels are two-dimensionally arranged, or may be a line sensor where a plurality of pixels are one-dimensionally (linearly) arranged. As the sensor 112, a well-known imaging element in the related art such as a charge-coupled device (CCD) image sensor or a complementary metal oxide semiconductor (CMOS) image sensor can be used.

The right circularly polarized light $I_{R1}$ and the left circularly polarized light $I_{L1}$, the right circularly polarized light $I_{R2}$ and the left circularly polarized light $I_{L2}$, and the right circularly polarized light $I_{R3}$ and the left circularly polarized light $I_{L3}$ that are converged by the condenser lens 110 are incident into the sensor 112, respectively. In this case, the right circularly polarized light $I_{R1}$ and the left circularly polarized light $I_{L1}$ are incident into the same position (pixel) of the sensor 112. In addition, the right circularly polarized light $I_{R2}$ and the left circularly polarized light $I_{L2}$ are incident into a position (pixel) different from that of the right circularly polarized light $I_{R1}$ and the left circularly polarized light $I_{L1}$. Further, the right circularly polarized light $I_{R3}$ and the left circularly polarized light $I_{L3}$ are incident into a position (pixel) different from that of the right circularly polarized light $I_{R1}$ and the left circularly polarized light $I_{L1}$ and that of the right circularly polarized light $I_{R2}$ and the left circularly polarized light $I_{L2}$.

Accordingly, the spectroscopic system 150 can detect the total light amount of the right circularly polarized light and the left circularly polarized light for each of the wavelengths at different pixels of the sensor 112. That is, the spectroscopic system 150 can measure a wavelength distribution of the dispersion target light.

In addition, In wavelength-division multiplexing where optical signals are simultaneously transmitted for communication using a plurality of different wavelengths, the spectroscopic system 150 can be used as a detector that continuously disperses and detects the light where the plurality of wavelengths are multiplexed to extract the optical signal in each of the wavelengths.

Here, in the spectroscopic system 150 (optical element 100*b*) shown in FIGS. 6 and 7, the single periods of the liquid crystal alignment patterns of the cholesteric liquid crystal layer 34R and the cholesteric liquid crystal layer 34L in the liquid crystal diffraction element 10*b* are the same, but the present invention is not limited thereto. However, the single period of the liquid crystal alignment pattern of the cholesteric liquid crystal layer 34R and the single period of the liquid crystal alignment pattern of the cholesteric liquid crystal layer 34L may be different from each other.

Figure 8:
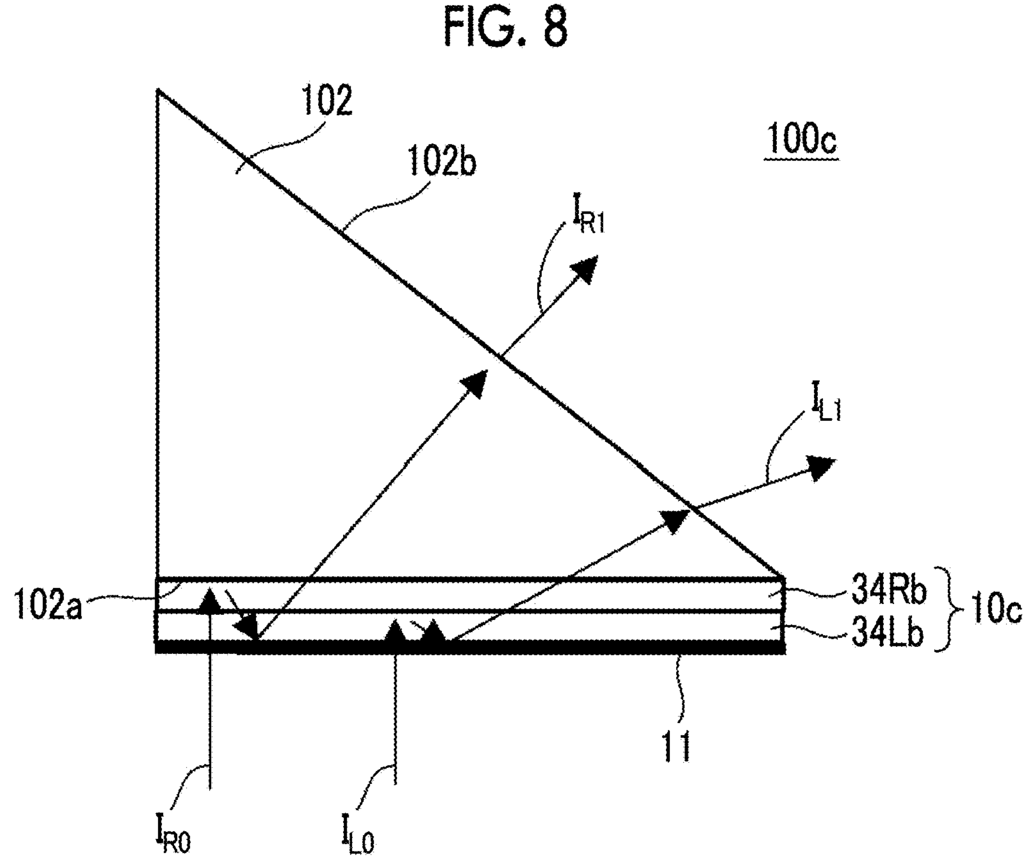
FIG. 8 is a diagram conceptually showing another example of the optical element in the spectroscopic system according to the present invention.

In FIG. 8, an optical element 100*c* in the spectroscopic system according to the embodiment of the present invention has the same configuration as the optical element 100*b* shown in FIG. 6, except that it includes a liquid crystal diffraction element 10*c* instead of the liquid crystal diffraction element 10*b*. Accordingly, the description of the same points as those of the optical element 100*b* will not be given, and different points will be described.

The optical element 100*c* includes a cholesteric liquid crystal layer 34Rb and a cholesteric liquid crystal layer 34Lb. The cholesteric liquid crystal layer 34Rb is a cholesteric liquid crystal layer that reflects right circularly polarized light, and the cholesteric liquid crystal layer 34Lb is a cholesteric liquid crystal layer that reflects left circularly polarized light.

In addition, a selective reflection wavelength of the cholesteric liquid crystal layer 34Rb and a selective reflection wavelength of the cholesteric liquid crystal layer 34Lb overlap each other and preferably match with each other.

As in the cholesteric liquid crystal layer 34 shown in FIGS. 2 and 3, both of the cholesteric liquid crystal layer 34Rb and the cholesteric liquid crystal layer 34Lb have the liquid crystal alignment pattern in which the orientation of the optical axis derived from the liquid crystal compound changes while continuously rotating in at least one in-plane direction. In addition the rotation direction of the liquid crystal alignment pattern in the cholesteric liquid crystal layer 34Rb that selectively reflects right circularly polarized light and the rotation direction of the liquid crystal alignment pattern in the cholesteric liquid crystal layer 34Lb that selectively reflects left circularly polarized light are the same as each other are opposite to each other.

Here, the length of the single period in the liquid crystal alignment pattern of the cholesteric liquid crystal layer 34Rb is different from the length of the single period in the liquid crystal alignment pattern of the cholesteric liquid crystal layer 34Lb. That is, the diffraction angle of light by the cholesteric liquid crystal layer 34Rb and the diffraction angle of light by the cholesteric liquid crystal layer 34Lb are different from each other.

An action of the spectroscopic system that includes the optical element 100*c* including the liquid crystal diffraction element 10*c* will be described using FIGS. 8 and 9. For convenience of description, FIG. 8 shows only an arrow representing light having one wavelength among light components that are reflected, diffracted, and dispersed by each of the cholesteric liquid crystal layer 34Rb and the cholesteric liquid crystal layer 34Lb. In addition, for convenience of description, FIG. 9 shows no arrow regarding the reflection, the dispersion, and the total reflection on the total reflection surface in the cholesteric liquid crystal layer.

As shown in FIG. 8, the spectroscopic system allows dispersion target light ($I_{R0}$ and $I_{L0}$) to be incident from the liquid crystal diffraction element 10*c* side into the optical element 100*c*. Among the dispersion target light components, the right circularly polarized light component $I_{R0}$ transmits through the cholesteric liquid crystal layer 34Lb and is reflected and dispersed by the cholesteric liquid crystal layer 34Rb. The reflected light $I_{R1}$ is totally reflected from the surface (total reflection surface 11) of the liquid crystal diffraction element 10*c* opposite to the prism 102, travels toward the prism 102, is incident into the prism 102, and is emitted from the second surface 102*b* of the prism 102. In addition, among the dispersion target light components, the left circularly polarized light component $I_{L0}$ is reflected and dispersed by the cholesteric liquid crystal layer 34Lb. The reflected light $I_{L1}$ is totally reflected from the surface (total reflection surface 11) of the liquid crystal diffraction element 10*c* opposite to the prism 102, travels toward the prism 102, transmits through the cholesteric liquid crystal layer 34Rb, is incident into the prism 102, and is emitted from the second surface 102*b* of the prism 102.

The length of the single period in the liquid crystal alignment pattern of the cholesteric liquid crystal layer 34Rb is different from the length of the single period in the liquid crystal alignment pattern of the cholesteric liquid crystal layer 34Lb. Therefore, a traveling direction of the light $I_{R1}$ having one wavelength that is dispersed by the cholesteric liquid crystal layer 34Rb is not parallel to a traveling direction of the light $I_{L1}$ having the same wavelength that is dispersed by the cholesteric liquid crystal layer 34Lb. Accordingly, the light $I_{R1}$ and the light $I_{L1}$ emitted from the second surface 102*b* of the prism 102 are not parallel to each other at each of the wavelengths.

Figure 9:
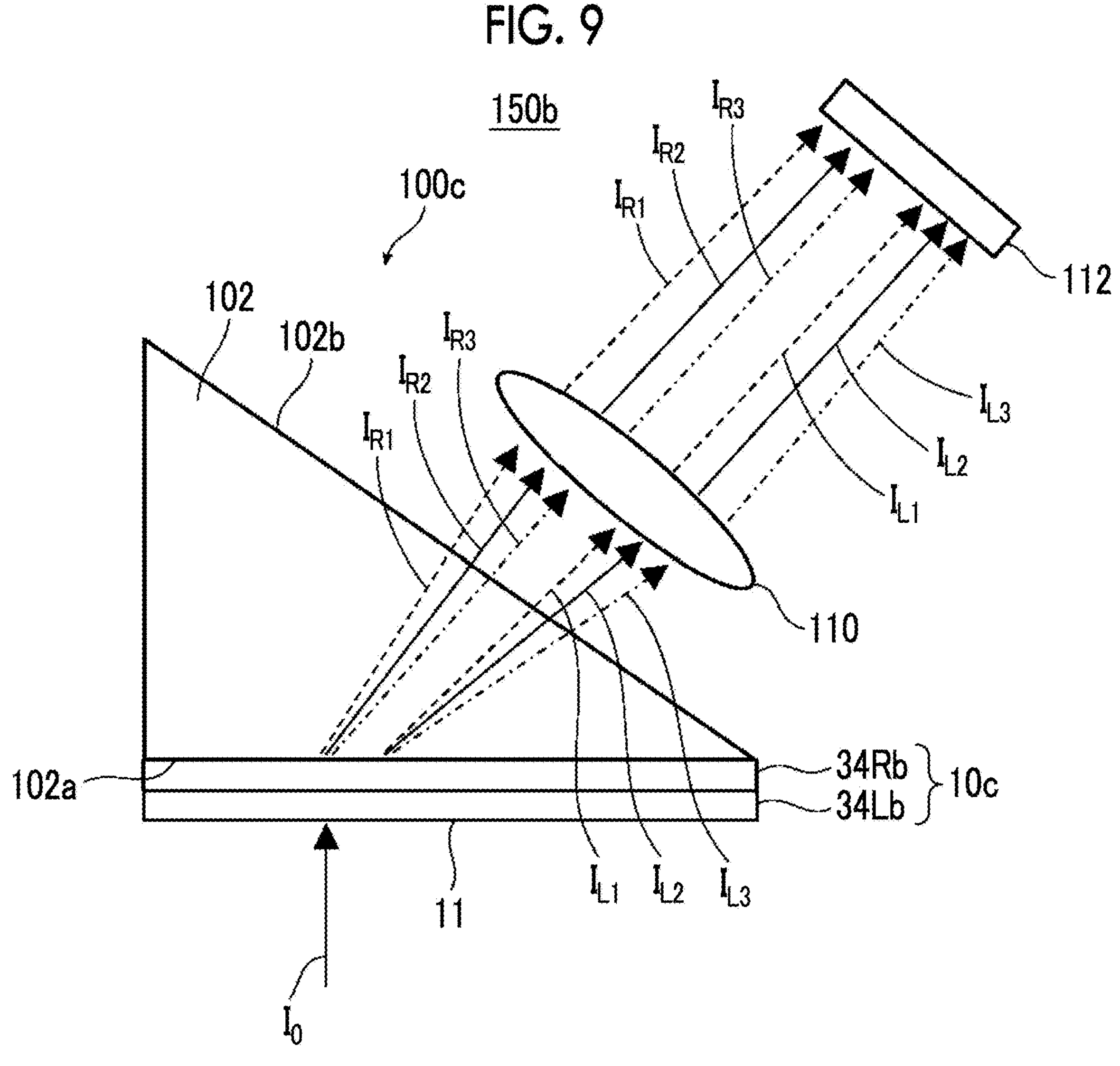
FIG. 9 is a diagram conceptually showing another example of the spectroscopic system including the optical element shown in FIG. 8.

FIG. 9 shows an example of the spectroscopic system including the optical element that emits the dispersion target light components not parallel to each other at each of the wavelengths as described above.

A spectroscopic system 150*b* shown in FIG. 9 includes the above-described optical element 100*c*, a condenser lens 110 that is disposed to be spaced on the second surface side of the optical element 100*c*, and a sensor 112 that is disposed opposite to the optical element 100*b* side of the condenser lens 110.

As described above, the optical element 100*c* disperses each of the right circularly polarized light component and the left circularly polarized light component of the incident dispersion target unpolarized light $I_0$, and emits the dispersed light from the second surface 102*b* of the prism 102. In this case, as shown in FIG. 9, the right circularly polarized light $I_{R1}$ and the left circularly polarized light $I_{L1}$ having the same wavelength are emitted non-parallel to each other, right circularly polarized light $I_{R2}$ and left circularly polarized light $I_{L2}$ that have a wavelength different from that of the right circularly polarized light $I_{R1}$ and the left circularly polarized light $I_{L1}$ are emitted non-parallel to each other, and right circularly polarized light $I_{R3}$ and left circularly polarized light $I_{L3}$ that are different from the above light components are emitted non-parallel to each other.

The light emitted from the second surface 102*b* of the prism 102 is incident into the condenser lens 110.

The condenser lens 110 converges the right circularly polarized light $I_{R1}$, the right circularly polarized light $I_{R2}$, and the right circularly polarized light $I_{R3}$ emitted in different directions to form focal points on the detection surface of the sensor 112, respectively. In addition, the condenser lens 110 converges the left circularly polarized light $I_{L1}$, the left circularly polarized light $I_{L2}$, and the left circularly polarized light $I_{L3}$ to form focal points on positions of the detection surface of the sensor 112 different from those of the right circularly polarized light $I_{R1}$, the right circularly polarized light $I_{R2}$, and the right circularly polarized light $I_{R3}$, respectively.

The light components transmitted through the condenser lens 110 are incident into different positions (pixels) of the sensor 112. Accordingly, the spectroscopic system 150*b* can detect the light amounts of the light components having different wavelengths and different polarization states at different pixels of the sensor 112. The spectroscopic system 150*b* having the above-described configuration can be used for polarization spectral imaging or the like.

In the example shown in FIG. 9, the light having each of the wavelengths of the right circularly polarized light and the light having each of the wavelengths of the left circularly polarized light are detected by one sensor 112, but the present invention is not limited thereto. The light having each of the wavelengths of the right circularly polarized light and the light having each of the wavelengths of the left circularly polarized light may be configured to be detected by different sensors.

Here, in the example shown in FIG. 1 and the like, the liquid crystal diffraction element 10 (cholesteric liquid crystal layer 34) diffracts incident light in the orientation direction toward the second surface 102*b* of the prism 102, but the present invention is not limited thereto.

Figure 10:
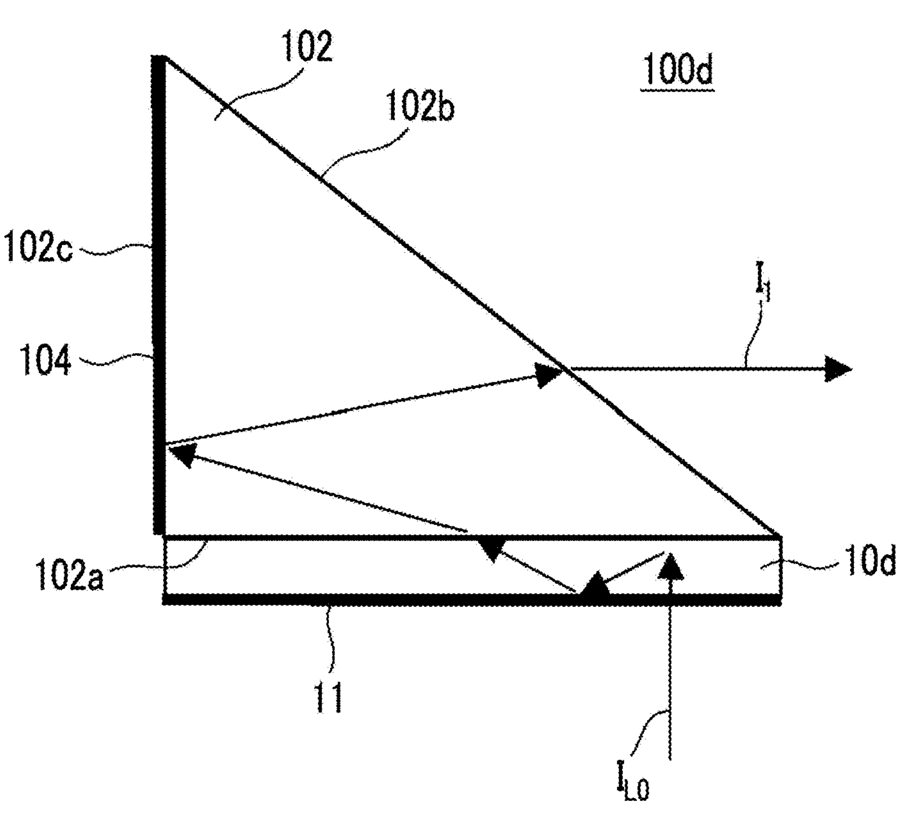
FIG. 10 is a diagram conceptually showing another example of the optical element in the spectroscopic system according to the present invention.

FIG. 10 is a diagram conceptually showing another example of the optical element in the spectroscopic system according to the present invention.

An optical element 100*d* shown in FIG. 10 includes the prism 102, a liquid crystal diffraction element 10*d* disposed on the first surface 102*a* of the prism 102, and a reflective layer 104 disposed on a third surface 102*c* of the prism 102. For convenience of description, FIG. 10 shows only an arrow representing light having one wavelength among light components that are reflected, diffracted, and dispersed by the cholesteric liquid crystal layers.

In the liquid crystal diffraction element 10*d*, an orientation direction in which light is reflected and diffracted from the cholesteric liquid crystal layer is opposite to the second surface 102*b* of the prism 102. That is, the cholesteric liquid crystal layer in the liquid crystal diffraction element 10*d* diffracts the dispersion target light $I_0$ in the orientation direction toward the third surface 102*c* side of the prism 102.

The light $I_1$ that is reflected, diffracted, and dispersed by the liquid crystal diffraction element 10*d* (cholesteric liquid crystal layer) is reflected from the total reflection surface 11 of the liquid crystal diffraction element 10*d* and is incident into the prism 102. The light $I_1$ incident into the prism 102 travels in the prism 102 and is incident into the third surface 102*c*. Since the reflective layer 104 is disposed on the third surface 102*c*, the light $I_1$ is reflected from the reflective layer 104, travels toward the second surface 102*b* side, and is emitted from the second surface 102*b*.

This way, the liquid crystal diffraction element (cholesteric liquid crystal layer) may be configured to diffract incident light in an orientation direction toward the third surface 102*c* that is opposite to the second surface 102*b* of the prism 102.

In the configuration shown in FIG. 10, in a case where the angle of the third surface 102*c* with respect to the first surface 102*a* is 90°, a traveling direction in which light is dispersed by the liquid crystal diffraction element 10*d*, is diffracted toward the third surface 102*c* side, is reflected from the reflective layer 104, and is emitted from the second surface 102*b* is parallel to a traveling direction in which light is diffracted toward the second surface 102*b* side by the liquid crystal diffraction element and is emitted from the second surface 102*b*.

The reflective layer 104 is not particularly limited, and a well-known reflective layer such as a metal layer can be appropriately used.

In the example shown in FIG. 10, the reflective layer 104 is provided on the third surface 102*c* of the prism 102, but the present invention is not limited thereto. The third surface 102*c* may totally reflect light.

In addition, in the spectroscopic system according to the embodiment of the present invention, the optical element may include a member other than the prism and the liquid crystal diffraction element. For example, a retardation layer may be provided on the first surface of the prism.

In addition, in the above-described example, the spectroscopic system is configured to include the optical element, the condenser lens, and the sensor, but the present invention is not limited thereto. For example, the spectroscopic system according to the embodiment of the present invention may be configured to include the optical element and the sensor. In this case, by using a light source having a small beam diameter, spectral spots separated on the sensor can be obtained.

Although the spectroscopic system according to the embodiment of the present invention has been described in detail above, the present invention is not limited to the examples described above. It goes without saying that the present invention may be improved or modified in various ways within a scope that does not depart from the gist of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

<Preparation of Liquid Crystal Diffraction Element>

(Formation of Alignment Film)

As a support, a glass substrate (EAGLE, manufactured by Corning Incorporated) was prepared. The following coating liquid for forming an alignment film was applied to the support by spin coating. The support on which the coating film of the coating liquid for forming an alignment film was formed was dried using a hot plate at 60° C. for 60 seconds. As a result, an alignment film P-2 was formed.

Coating Liquid for Forming Alignment Film

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

Material for Photo-Alignment

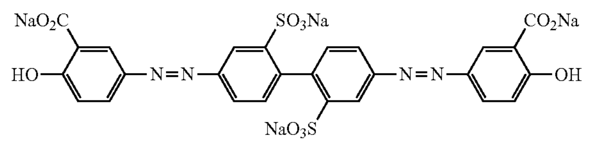

(Exposure of Alignment Film)

The alignment film was exposed using the exposure device shown in FIG. 5 to form an alignment film P-2 having an alignment pattern. In the exposure device, a laser that emits laser light having a wavelength (325 nm) was used as the laser. The exposure amount of the interference light was 300 mJ/cm$^2$. An intersecting angle (intersecting angle $\alpha$) between the two laser beams was adjusted such that the single period $\Lambda$ (the length over which the optical axis rotates by) 180° of an alignment pattern formed by interference of the two laser beams was 0.7 μm.

(Formation of Liquid Crystal Layer)

As the liquid crystal composition forming the liquid crystal layer, the following composition B-2 was prepared.

Composition B-2

| | |
|---|---|
| Rod-like liquid crystal compound L-1 | 100.00 parts by mass |
| Photopolymerization initiator(KAYACURE DETX-S, manufactured by Nippon Kayaku Co., Ltd.) | 1.00 part by mass |
| Chiral agent Ch-3 | 4.00 parts by mass |
| Methyl ethyl ketone | 142.06 parts by mass |

Rod-like liquid crystal compound L-1 (including the following structures at a mass ratio shown on the right side)

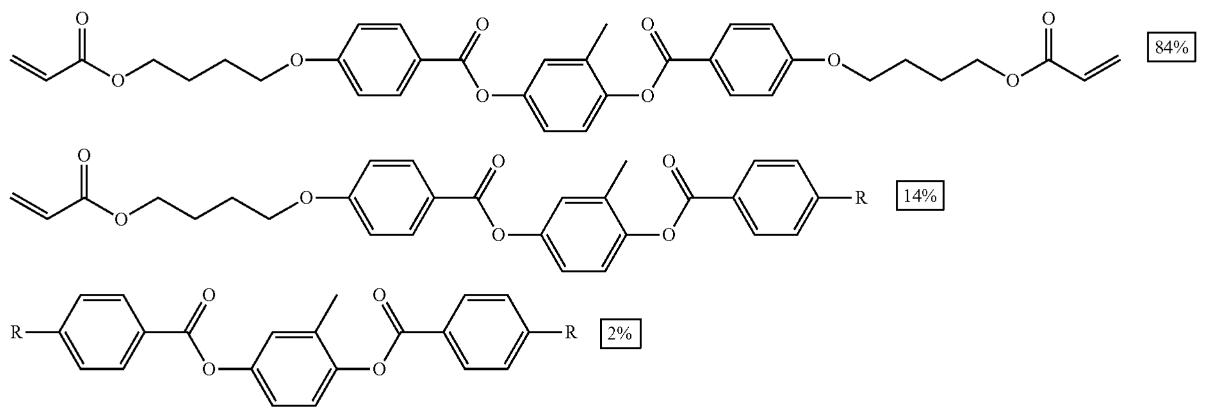

-continued

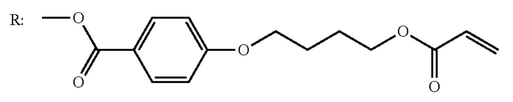

Chiral Agent Ch-3

Chiral Agent Ch-3

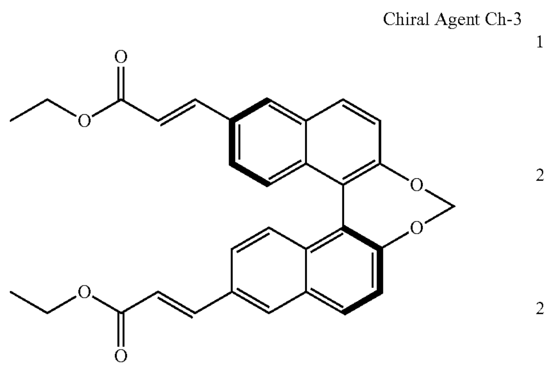

The above-described liquid crystal composition B-2 was applied to the alignment film P-2 using a spin coater at 500 rpm for 10 seconds (coating step). Next, the coating film of the liquid crystal composition B-2 was heated on a hot plate at 80° C. for 3 minutes (180 sec) (heating step). Next, the liquid crystal composition was exposed using a high-pressure mercury lamp at 100° C. in a nitrogen atmosphere through a long pass filter of 300 nm and a short pass filter of 350 nm such that the irradiation dose of light measured at a wavelength of 315 nm was 9 mJ/cm$^2$ (first exposure step). The first exposure step is for controlling the liquid crystal layer to have regions where the helical pitches are different at positions in the thickness direction. Next, at 100° C., the coating film was exposed to ultraviolet light having a wavelength of 365 nm at an irradiation dose of 1000 mJ/cm$^2$ using a high-pressure mercury lamp in a nitrogen atmosphere (second exposure step). The second exposure step is for curing the liquid crystal composition to immobilize the alignment of the liquid crystal compound. This way, the cholesteric liquid crystal layer was formed.

In the cholesteric liquid crystal layer, the final film thickness was 7 μm, the single period Λ of the liquid crystal alignment pattern was 0.7 μm, the cholesteric alignment was right-twisted. In a cross sectional image obtained by a SEM, due to the cholesteric alignment and the liquid crystal alignment pattern in a plane, bright and dark lines oblique to a lower interface (interface with the glass substrate) of the cholesteric liquid crystal layer were observed. The angle of the bright and dark lines gradually changed in the thickness direction, the angle was 15° to 50°, and a structure functioning as a broadband reflective diffraction element was observed.

<Manufacturing of Optical Element>

The prepared liquid crystal diffraction element was transferred and bonded to a bottom surface of a prepared prism. The prism is an optical glass having a model number of SK2 (manufactured by SCHOTT AG), and the refractive index at a wavelength of 633 nm was 1.605. The prepared prism is a prism where a slope (second surface) is configured with respect to the bottom surface (first surface), and the angle of the slope with respect to the bottom surface is 53°. A bonding direction of the cholesteric liquid crystal layer was configured such that a direction (direction orthogonal to the bright and dark lines) of an in-plane diffraction vector of the cholesteric liquid crystal layer was orthogonal to a direction of a boundary line between the bottom surface and the slope. The bonding was performed by directly bonding the cholesteric liquid crystal layer peeled off from the support through an adhesion force strengthening surface treatment of a plasma treatment. This way, an optical element was prepared.

<Preparation of Spectroscopic System>

Using the prepared optical element, a spectroscopic system was prepared.

In the spectroscopic system, the collimated dispersion target light was allowed to be incident into the optical element from the cholesteric liquid crystal layer side. In this case, the incidence angle was 30°. The dispersion target light is unpolarized light in a visible range, and the wavelength thereof is 450 to 650 nm.

In addition, a condenser lens and a line sensor were disposed on the second surface side of the prism of the optical element to prepare a spectroscopic system.

[Evaluation]

Figure 11:
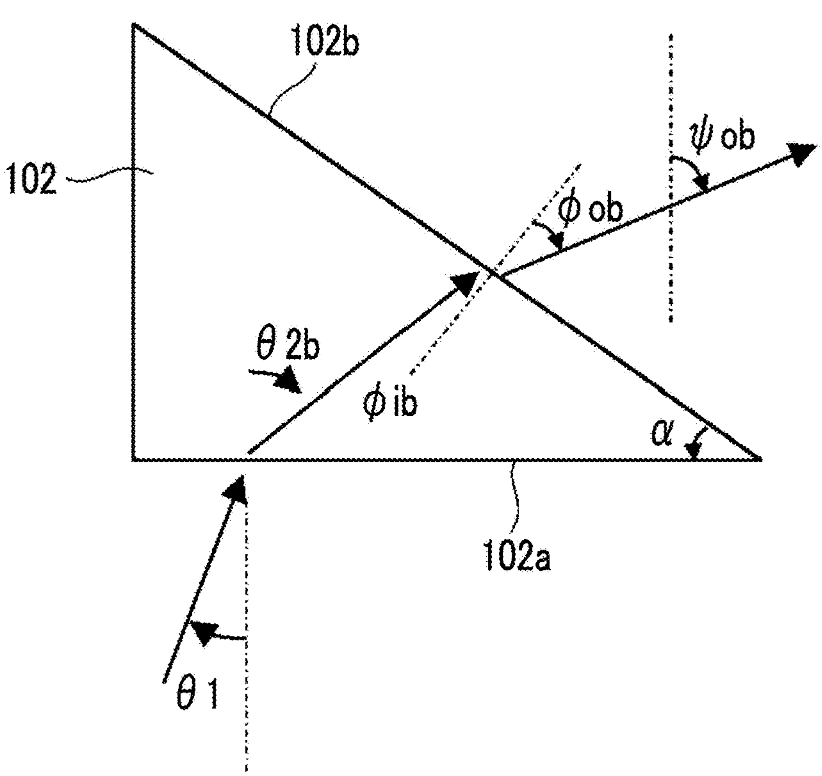
FIG. 11 is a diagram showing an angle at each of positions at which light is incident into the optical element.

In the prepared spectroscopic system, the dispersion target light was incident into the optical element. Among the incident dispersion target light components, the right circularly polarized light component was obliquely reflected and diffracted by the liquid crystal diffraction element, was totally reflected from the total reflection surface, transmitted through the liquid crystal diffraction element, and was emitted from the second surface of the prism. In the spectroscopic system, the light having each of the wavelengths emitted from the second surface was converged and detected by the line sensor. As a result, a light amount of 80% or more was detected with respect to the light amount during incidence for all of the wavelengths of the diffracted right circularly polarized light. In addition, Table 1 shows the angle at each of the positions of the light traveling in the optical element as shown in FIG. 11. θ1 shown in FIG. 11 represents the angle of incidence light (incidence angle) with respect to the direction perpendicular to the main surface of the liquid crystal diffraction element of the optical element. θ2*b* represents the angle of the light incident from the liquid crystal diffraction element into the prism with respect to the direction perpendicular to the interface between the liquid crystal diffraction element and the prism. φib represents the angle of the light traveling in the prism and reaching the second surface with respect to the direction perpendicular to the second surface. φob represents the angle of the light emitted from the second surface with respect to the direction perpendicular to the second surface. ψob represents the angle of the light emitted from the second surface with respect to the direction perpendicular to the main surface of the liquid crystal diffraction element of the optical element.

TABLE 1

| Single Period Λ (μm) | Wavelength λ (nm) | λ/Λ | θ1 (°) | θ2b (°) | α (°) | φib (°) | φob (°) | ψob (°) |
|---|---|---|---|---|---|---|---|---|
| 0.7 | 450 | 0.63 | 30 | 44.2 | 53 | −8.8 | −14.4 | 38.6 |
| | 550 | 0.79 | | 53 | | 0 | 0 | 53 |
| | 650 | 0.93 | | 63 | | 10 | 16.1 | 69.1 |

Example 2

An optical element was prepared and a spectroscopic system was prepared using the same method as that of Example 1, except that the cholesteric liquid crystal layer was changed to the following two cholesteric liquid crystal layers.

<Preparation of Two Cholesteric Liquid Crystal Layers>

The two cholesteric liquid crystal layers were prepared by bonding and laminating a right-twisted cholesteric liquid crystal layer and a left-twisted cholesteric liquid crystal layer.

The right-twisted cholesteric liquid crystal layer was prepared using the same method as that of Example 1.

The left-twisted cholesteric liquid crystal layer was prepared using the same method as that of Example 1, except that the chiral agent of the composition B-2 was changed to Ch-4.

Chiral Agent Ch-4

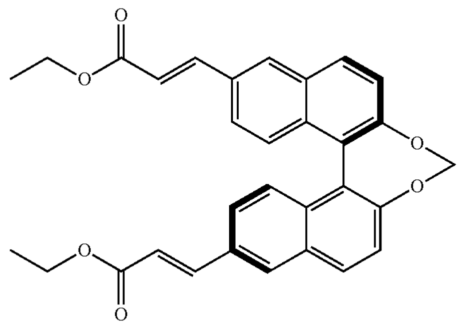

In the left-twisted cholesteric liquid crystal layer, the final film thickness was 7 μm, and the single period Λ of the liquid crystal alignment pattern was 0.7 μm. In a cross sectional image obtained by a SEM, due to the cholesteric alignment and the liquid crystal alignment pattern in a plane, bright and dark lines oblique to a lower interface (interface with the glass substrate) of the cholesteric liquid crystal layer were observed. The angle of the bright and dark lines gradually changed in the thickness direction, the angle was 15° to 50°, and a structure functioning as a broadband reflective diffraction element was observed. The tilt direction of the bright and dark lines was opposite to that of the right-twisted cholesteric liquid crystal layer, and the reason for this is that the twisted angle was opposite to that of the right-twisted cholesteric liquid crystal layer.

The prepared right-twisted and left-twisted cholesteric liquid crystal layers were laminated and bonded. In order that the tilt directions of the bright and dark lines during the lamination matched with each other, the left-twisted cholesteric liquid crystal layer was inverted in the 180° direction during bonding and bonded. This way, the cholesteric liquid crystal layer according to Example 2 was prepared.

[Evaluation]

The prepared spectroscopic system was evaluated using the same method as that of Example 1. As a result of the evaluation, an efficiency of 80% or more was able to be detected for all of the wavelengths of the diffracted right circularly polarized light and the diffracted left circularly polarized light. In addition, the angle of each of the light components traveling in the optical element was the same as that of Example 1.

Example 3

An optical element was prepared and a spectroscopic system was prepared using the same method as that of Example 2, except that a prism where the tilt angle of the slope (second surface) with respect to the bottom surface (first surface) was 35° was used as the prism.

[Evaluation]

The prepared spectroscopic system was evaluated using the same method as that of Example 1. As a result of the evaluation, an efficiency of 80% or more was able to be detected for all of the wavelengths of the diffracted right circularly polarized light and the diffracted left circularly polarized light. In addition, the angle of the light traveling in the optical element at each of the positions is as shown in Table 2.

TABLE 2

| Single Period Λ (μm) | Wavelength λ (nm) | λ/Λ | θ1 (°) | θ2b (°) | α (°) | φib (°) | φob (°) | ψob (°) |
|---|---|---|---|---|---|---|---|---|
| 0.7 | 450 | 0.63 | 30 | 44.2 | 35 | 9.2 | 14.9 | 49.9 |
| | 550 | 0.79 | | 53 | | 18 | 29.8 | 64.8 |
| | 650 | 0.93 | | 63 | | 28 | 48.8 | 83.8 |

Example 4

An optical element was prepared and a spectroscopic system was prepared using the same method as that of Example 2, except that a prism where the tilt angle of the slope (second surface) with respect to the bottom surface (first surface) was 70° was used as the prism.

[Evaluation]

The prepared spectroscopic system was evaluated using the same method as that of Example 1. As a result of the evaluation, an efficiency of 80% or more was able to be detected for all of the wavelengths of the diffracted right circularly polarized light and the diffracted left circularly polarized light. In addition, the angle of the light traveling in the optical element at each of the positions is as shown in Table 3.

TABLE 3

| Single Period Λ (μm) | Wavelength λ (nm) | λ/Λ | θ1 (°) | θ2b (°) | α (°) | φib (°) | φob (°) | ψob (°) |
|---|---|---|---|---|---|---|---|---|
| 0.7 | 450 | 0.63 | 30 | 44.2 | 70 | −25.8 | −44.9 | 25.1 |
| | 550 | 0.79 | | 53 | | −17 | −28.1 | 41.9 |
| | 650 | 0.93 | | 63 | | −7 | −11.4 | 58.7 |

Comparative Example 1

An optical element was prepared and a spectroscopic system was prepared using the same method as that of Example 2, except that a prism where the tilt angle of the slope (second surface) with respect to the bottom surface (first surface) was 3° was used as the prism.

[Evaluation]

In a case where the prepared spectroscopic system was evaluated using the same method as that of Example 1, the angle of the light reaching the second surface with respect to the second surface was more than the critical angle. Therefore, the light was totally reflected from the second surface without being emitted, and the spectroscopic system did not function. The angle of the light traveling in the optical element at each of the positions is as shown in Table 4.

TABLE 4

| Single Period Λ (μm) | Wavelength λ (nm) | λ/Λ | θ1 (°) | θ2b (°) | α (°) | φib (°) | φob (°) | ψob (°) |
|---|---|---|---|---|---|---|---|---|
| 0.7 | 450 | 0.63 | 30 | 44.2 | 5 | 41 | Not Emitted | |
| | 550 | 0.79 | | 53 | | 50 | Not Emitted | |
| | 650 | 0.93 | | 63 | | 60 | Not Emitted | |

Example 5

An optical element was prepared using the same method as that of Example 2, except that the single period of the liquid crystal alignment pattern of each of the right-twisted and left-twisted cholesteric liquid crystal layer was changed to 0.43 μm. A spectroscopic system was prepared using the same method as that of Example 2, except that the incidence angle of the dispersion target light was 0°.

[Evaluation]

The prepared spectroscopic system was evaluated using the same method as that of Example 1. As a result of the evaluation, an efficiency of 80% or more was able to be detected for all of the wavelengths of the diffracted right circularly polarized light and the diffracted left circularly polarized light. In addition, the angle of the light traveling in the optical element at each of the positions is as shown in Table 5.

TABLE 5

| Single Period Λ (μm) | Wavelength λ (nm) | λ/Λ | θ1 (°) | θ2b (°) | α (°) | φib (°) | φob (°) | ψob (°) |
|---|---|---|---|---|---|---|---|---|
| 0.43 | 450 | 1.02 | 0 | 39.2 | 53 | −13.8 | −22.8 | 30.2 |
| | 550 | 1.28 | | 52.6 | | −0.4 | −0.6 | 52.4 |
| | 650 | 1.51 | | 70.5 | | 17.5 | 28.8 | 81.8 |

An optical element was prepared using the same method as that of Example 2, except that the single period of the liquid crystal alignment pattern of each of the right-twisted and left-twisted cholesteric liquid crystal layer was changed to 0.8 μm, and a spectroscopic system was prepared.

[Evaluation]

The prepared spectroscopic system was evaluated using the same method as that of Example 1. As a result of the evaluation, an efficiency of 80% or more was able to be detected for all of the wavelengths of the diffracted right circularly polarized light and the diffracted left circularly polarized light. In addition, the angle of the light traveling in the optical element at each of the positions is as shown in Table 6.

TABLE 6

| Single Period Λ (μm) | Wavelength λ (nm) | λ/Λ | θ1 (°) | θ2b (°) | α (°) | φib (°) | φob (°) | ψob (°) |
|---|---|---|---|---|---|---|---|---|
| 0.8 | 450 | 0.55 | 30 | 40.4 | 53 | −12.6 | −20.7 | 32.3 |
| | 550 | 0.69 | | 47.5 | | −5.5 | −8.8 | 44.2 |
| | 650 | 0.81 | | 54.9 | | 1.9 | 3.1 | 56.1 |

Example 7

An optical element was prepared using the same method as that of Example 2, except that the single period of the liquid crystal alignment pattern of each of the right-twisted and left-twisted cholesteric liquid crystal layer was changed to 1.0 μm. A spectroscopic system was prepared using the same method as that of Example 2, except that the incidence angle of the dispersion target light was 35°.

[Evaluation]

The prepared spectroscopic system was evaluated using the same method as that of Example 1. As a result of the evaluation, an efficiency of 80% or more was able to be detected for all of the wavelengths of the diffracted right circularly polarized light and the diffracted left circularly polarized light. In addition, the angle of the light traveling in the optical element at each of the positions is as shown in Table 7.

TABLE 7

| Single Period Λ (μm) | Wavelength λ (nm) | λ/Λ | θ1 (°) | θ2b (°) | α (°) | φib (°) | φob (°) | ψob (°) |
|---|---|---|---|---|---|---|---|---|
| 1 | 450 | 0.44 | 35 | 38.7 | 53 | −14.3 | −23.5 | 29.5 |
| | 550 | 0.55 | | 44.3 | | −8.7 | −14.2 | 38.8 |
| | 650 | 0.65 | | 49.7 | | −3.3 | −5.3 | 47.7 |

Comparative Example 2

An optical element was prepared using the same method as that of Example 2, except that the single period of the liquid crystal alignment pattern of each of the right-twisted and left-twisted cholesteric liquid crystal layer was changed to 1.5 μm, and a spectroscopic system was prepared.

[Evaluation]

n a case where the prepared spectroscopic system was evaluated using the same method as that of Example 1, the angle of the light reflected from the liquid crystal diffraction element and returning to the surface on the incidence side was less than the critical angle. Therefore, the light was not totally reflected from the surface on the incidence side and was not incident into the prism, and the spectroscopic system did not function. The angle of the light traveling in the optical element at each of the positions is as shown in Table 8.

TABLE 8

| Single Period Λ (μm) | Wavelength λ (nm) | λ/Λ | θ1 (°) | θ2b (°) | α (°) | φib (°) | φob (°) | ψob (°) |
|---|---|---|---|---|---|---|---|---|
| 1.5 | 450 | 0.29 | 30 | Not Emitted | 35 | | Not Emitted | |
| | 550 | 0.37 | | Not Emitted | | | Not Emitted | |
| | 650 | 0.43 | | Not Emitted | | | Not Emitted | |

Example 8

An optical element was prepared by bonding right-twisted and left-twisted cholesteric liquid crystal layers where the single period of the liquid crystal alignment pattern was 0.43 μm using the same method as that of Example 5, except that the following compositions B-3 and B-4 were used as the liquid crystal compositions for forming the liquid crystal layers. A spectroscopic system was prepared using the same method as that of Example 5, except that the incidence angle of the dispersion target light was 0°.

Composition B-3 (Composition for Right-Twisted Cholesteric Liquid Crystal Layer)

| | |
|---|---|
| Rod-like liquid crystal compound L-1 | 100.00 parts by mass |
| Photopolymerization initiator(KAYACURE DETX-S, manufactured by Nippon Kayaku Co., Ltd.) | 1.00 part by mass |
| Surfactant T-1 | 0.05 parts by mass |
| Chiral agent Ch-3 | 4.00 parts by mass |
| Methyl ethyl ketone | 142.06 parts by mass |

Composition B-4 (Composition for Left-Twisted Cholesteric Liquid Crystal Layer)

| | |
|---|---|
| Rod-like liquid crystal compound L-1 | 100.00 parts by mass |
| Photopolymerization initiator(KAYACURE DETX-S, manufactured by Nippon Kayaku Co., Ltd.) | 1.00 part by mass |
| Surfactant T-1 | 0.05 parts by mass |
| Chiral agent Ch-4 | 4.00 parts by mass |
| Methyl ethyl ketone | 142.06 parts by mass |

Surfactant T-1

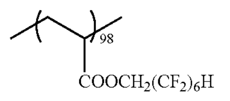

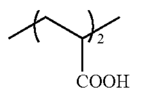

[Evaluation]

The prepared spectroscopic system was evaluated using the same method as that of Example 1. As a result of the evaluation, an efficiency of 85% or more was able to be detected for all of the wavelengths of the diffracted right circularly polarized light and the diffracted left circularly polarized light. In addition, the angle of the light traveling in the optical element at each of the positions is as shown in Table 5.

Example 9

An optical element was prepared by bonding right-twisted and left-twisted cholesteric liquid crystal layers where the single period of the liquid crystal alignment pattern was 0.43 μm using the same method as that of Example 8, except that the surfactant was changed from T-1 to T-2 below. A spectroscopic system was prepared using the same method as that of Example 8, except that the incidence angle of the dispersion target light was 0°.

Surfactant T-2

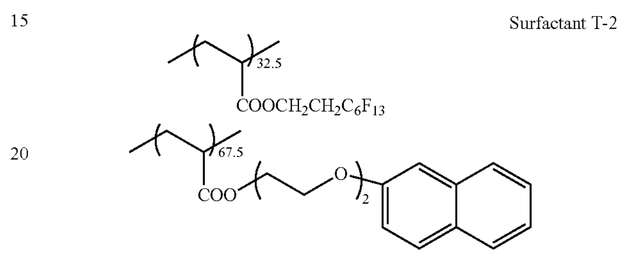

[Evaluation]

The prepared spectroscopic system was evaluated using the same method as that of Example 1. As a result of the evaluation, an efficiency of 85% or more was able to be detected for all of the wavelengths of the diffracted right circularly polarized light and the diffracted left circularly polarized light. In addition, the angle of the light traveling in the optical element at each of the positions is as shown in Table 5.

As can be seen from the above results, the effects of the present invention are obvious.

EXPLANATION OF REFERENCES

- 10, 10*b* to 10*d*: liquid crystal diffraction element
- 11: total reflection surface
- 30: support
- 32: alignment film
- 34: cholesteric liquid crystal layer
- 34R, 34Rb: cholesteric liquid crystal layer that reflects right circularly polarized light
- 34L, 34Lb: cholesteric liquid crystal layer that reflects left circularly polarized light
- 40: liquid crystal compound
- 40A: optical axis
- 60: exposure device
- 62: laser
- 64: light source
- 65: N/2 plate
- 68: beam splitter
- 70A, 70B: mirror
- 72A, 72B: 24 plate
- 100, 100*b*, 100*c*: optical element
- 102: prism
- 102*a*: first surface
- 102*b*: second surface
- 102*c*: third surface
- 104: reflective layer
- 110: lens
- 112: sensor
- 150, 150*b*: spectroscopic system
- 200: cholesteric liquid crystal layer $I_0$: dispersion target light
$I_{R0}$: right circularly polarized light component of dispersion target light
$I_{L0}$: left circularly polarized light component of dispersion target light
$I_1$, $I_2$, $I_3$: dispersed light
$I_{R1}$, $I_{R2}$, $I_{R3}$: dispersed right circularly polarized light
$I_{L1}$, $I_{L2}$, $I_{L3}$: dispersed left circularly polarized light
Λ: single period
D: arrangement axis
$R_R$: right circularly polarized light
M: laser light
MA, MB: beam
$P_O$: linearly polarized light
$P_R$: right circularly polarized light
$P_L$: left circularly polarized light
α: intersecting angle

What is claimed is:

1. A spectroscopic system comprising an optical element,
wherein the optical element includes a prism and a liquid crystal diffraction element disposed on a first surface of the prism directly or with another layer interposed between the prism and the liquid crystal diffraction element,
the prism has a second surface tilted with respect to the first surface,
a tilt angle of the second surface with respect to the first surface is 4° or more,
the liquid crystal diffraction element includes a cholesteric liquid crystal layer obtained by immobilizing a cholesteric liquid crystalline phase,
the cholesteric liquid crystal layer has a liquid crystal alignment pattern in which an orientation of an optical axis derived from a liquid crystal compound changes while continuously rotating in at least one in-plane direction,
in a case where a length over which the orientation of the optical axis derived from the liquid crystal compound in the liquid crystal alignment pattern rotates by 180° is set as a single period, a length of the single period is 0.1 to 1.4 μm, and
the spectroscopic system allows dispersion target light to be incident into the liquid crystal diffraction element side, reflects the incident light from the liquid crystal diffraction element, totally reflects the reflected light from a surface of the liquid crystal diffraction element opposite to the prism side, allows the totally reflected light to be incident into the prism, and emits the dispersed light from the second surface.

2. The spectroscopic system according to claim 1,
wherein the liquid crystal diffraction element includes the cholesteric liquid crystal layers where twisted directions of helical structures are different from each other.

3. The spectroscopic system according to claim 2,
wherein the tilt angle of the second surface with respect to the first surface of the prism is 4° to 5°.

4. The spectroscopic system according to claim 3,
wherein in a case where a wavelength of the dispersion target light is represented by λ, the wavelength λ and a single period Λ of the liquid crystal alignment pattern satisfy a relationship of Expression (1), $$0.44 \leq \lambda/\Lambda \leq 1.51. \quad \text{Expression (1)}$$

5. The spectroscopic system according to claim 1,
wherein the tilt angle of the second surface with respect to the first surface of the prism is 4° to 5°.

6. The spectroscopic system according to claim 5,
wherein in a case where a wavelength of the dispersion target light is represented by λ, the wavelength λ and a single period Λ of the liquid crystal alignment pattern satisfy a relationship of Expression (1), $$0.44 \leq \lambda/\Lambda \leq 1.51. \quad \text{Expression (1)}$$

* * * * *